US010312773B2

(12) United States Patent
Uchimura et al.

(10) Patent No.: US 10,312,773 B2
(45) Date of Patent: Jun. 4, 2019

(54) MOTOR APPARATUS

(71) Applicant: Mitsuba Corporation, Gunma (JP)

(72) Inventors: Hiroyuki Uchimura, Gunma (JP); Masashi Suto, Gunma (JP); Hiromitsu Takahashi, Gunma (JP); Takayuki Yokoyama, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 731 days.

(21) Appl. No.: 14/787,362

(22) PCT Filed: Apr. 24, 2014

(86) PCT No.: PCT/JP2014/061595
§ 371 (c)(1),
(2) Date: Oct. 27, 2015

(87) PCT Pub. No.: WO2014/178329
PCT Pub. Date: Nov. 6, 2014

(65) Prior Publication Data
US 2016/0072368 A1  Mar. 10, 2016

(30) Foreign Application Priority Data

Apr. 30, 2013 (JP) ................................. 2013-094897

(51) Int. Cl.
*H02K 5/22* (2006.01)
*H01R 39/36* (2006.01)
(Continued)

(52) U.S. Cl.
CPC ......... *H02K 11/0094* (2013.01); *H02K 5/225* (2013.01); *H02K 7/1166* (2013.01);
(Continued)

(58) Field of Classification Search
CPC .......... H02K 5/22; H02K 5/225; H02K 11/38; H02K 5/143; H02K 5/14; H02K 13/10;
(Continued)

(56) References Cited

U.S. PATENT DOCUMENTS 5,099,717 A * 3/1992 Ochiai ..................... H02K 5/15
74/425
5,382,857 A * 1/1995 Schellhorn ............. H02K 5/225
310/71

(Continued)

FOREIGN PATENT DOCUMENTS

DE   10 2008 030 739 A1   12/2009
DE   10 2008 042 244 A1    4/2010
(Continued)

OTHER PUBLICATIONS

Extended European Search Report for Application No. 14791430.3-1809 dated Nov. 28, 2016.
(Continued)

*Primary Examiner* — Quyen P Leung
*Assistant Examiner* — Alexander Moraza
(74) *Attorney, Agent, or Firm* — McCormick, Paulding & Huber LLP

(57) ABSTRACT

Each cross-section of the connector member assembling hole and the assembly main body 51a in a direction intersecting the insertion direction has a point-symmetrical circular shape with the insertion shaft center FC as the center. A pair of connector-side female terminals 57a, opposed to each other with the insertion shaft center FC as the center, is provided at the distal end side in the insertion direction of the assembly main body 51a, and a pair of brush-side male terminals, opposed to each other with the insertion shaft center FC as the center and to which the connector-side female terminals 57a are connected, is provided to a portion
(Continued)

of the brush holder opposite to the connector member assembling hole. Therefore, it is possible to insert the connector member 50 into the gear case in the state of being rotated by 180 degrees about the insertion shaft center FC, and it is possible to cope with arrangement needs which are different by 180 degrees in a connection direction of the external connector, using one connector member 50.

9 Claims, 15 Drawing Sheets

(51) Int. Cl.
*H02K 11/00* (2016.01)
*H02K 7/116* (2006.01)
*H01R 39/38* (2006.01)
*H02K 5/14* (2006.01)

(52) U.S. Cl.
CPC .......... *H02K 11/0021* (2013.01); *H01R 39/36* (2013.01); *H01R 39/383* (2013.01); *H02K 5/148* (2013.01); *H02K 2213/09* (2013.01)

(58) Field of Classification Search
CPC ........ H02K 13/00; H02K 23/18; H01R 39/00; H01R 39/02; H01R 39/36; H01R 39/38; H01R 39/383; H01R 39/385; H01R 39/40
USPC .... 310/71, 249, 89, 239, 241, 242, 245, 248
See application file for complete search history.

(56) References Cited

U.S. PATENT DOCUMENTS

| | | |
|---|---|---|
| 6,317,332 B1* | 11/2001 | Weber ................ B60R 16/0239 310/71 |
| 6,509,661 B1 | 1/2003 | Kujira et al. |
| 2010/0320857 A1 | 12/2010 | Mizutani |
| 2012/0025643 A1* | 2/2012 | Shibusawa ............ H02K 5/225 310/71 |
| 2012/0112579 A1* | 5/2012 | Kokubu ................ H02K 5/225 310/71 |

FOREIGN PATENT DOCUMENTS

| | | |
|---|---|---|
| DE | 10 2009 045 339 A1 | 4/2011 |
| DE | 10 2011 121 764 A1 | 6/2012 |
| EP | 2 267 845 A2 | 12/2010 |
| JP | 11150924 A | 6/1999 |
| JP | 2000217306 A | 8/2000 |
| JP | 2011041408 A | 2/2011 |
| JP | 2011254676 A | 12/2011 |

OTHER PUBLICATIONS

International Search Report for PCT Serial No. PCT/JP2014/061595 dated Jun. 25, 2014.

\* cited by examiner (a)

(b)

(a)

(b)

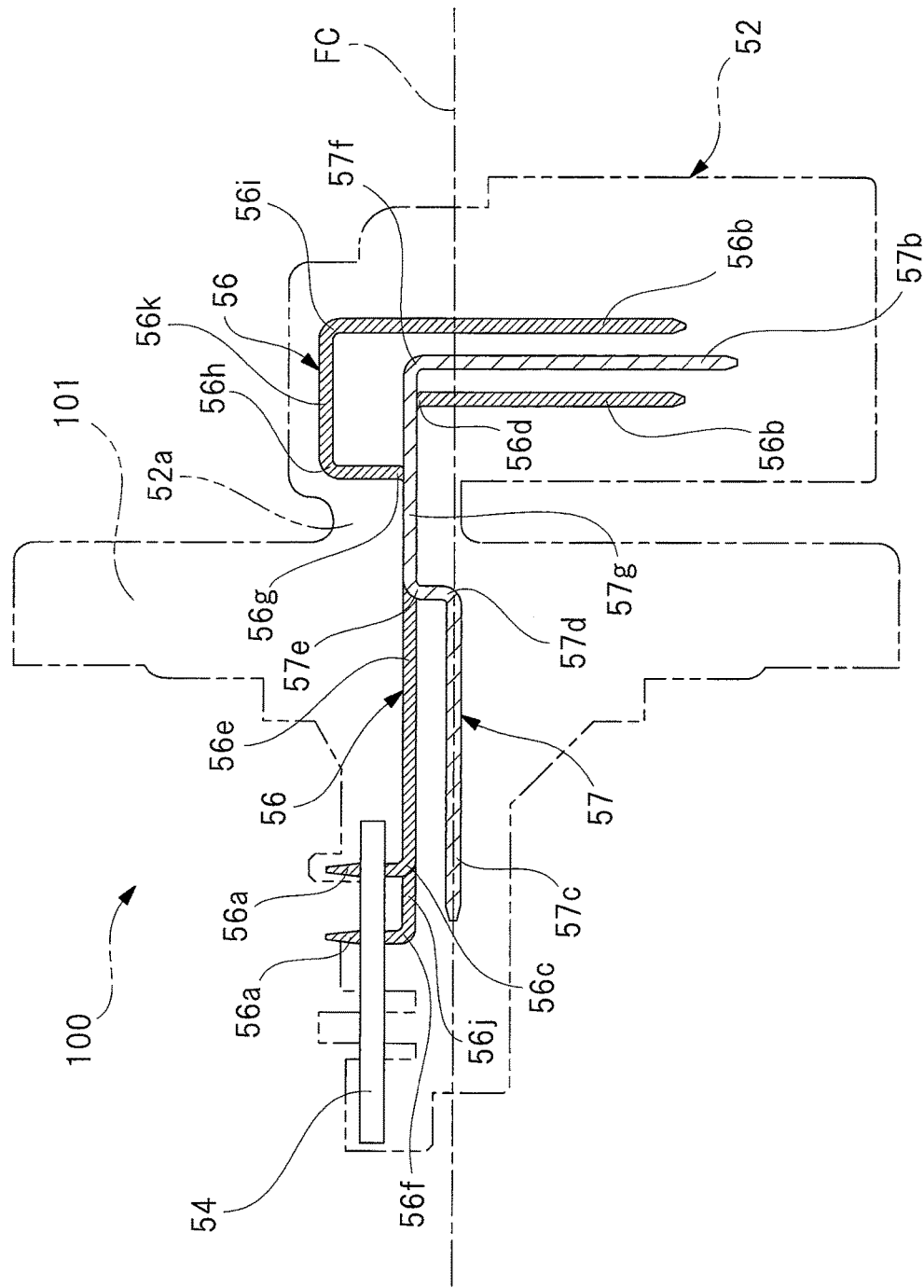

MOTOR APPARATUS

CROSS REFERENCE TO RELATED APPLICATION

Applicant hereby claims foreign priority benefits under U.S.C. § 119 from International Patent Application Serial No. PCT/JP2014/061595 filed on Apr. 24, 2014 and Japanese Patent Application Serial No. 2013-094897 filed on Apr. 30, 2013, the contents of which are incorporated by reference herein.

TECHNICAL FIELD OF THE INVENTION

The present invention relates to a motor apparatus including: a housing in which a rotation shaft is accommodated; and a connector member which is mounted on the housing and to which an external connector is connected.

BACKGROUND OF THE INVENTION

Conventionally, a compact motor apparatus having a deceleration mechanism capable of obtaining a high output is used as a drive source of a power window system or the like to be mounted on a vehicle such as automotive vehicle. The motor apparatus is configured to rotate an output shaft in a forward direction or a backward direction by operation of an operation switch so as to open and close an opening and closing member such as a window glass.

For example, a technique described in Japanese Patent Application Laid-Open Publication No. 2011-254676 (FIGS. 1 and 2) has been known as such a motor apparatus provided with the deceleration mechanism. A motor apparatus described in Japanese Patent Application Laid-Open Publication No. 2011-254676 (FIGS. 1 and 2) is provided with a motor portion and a gear portion in which an armature shaft (rotation shaft) is rotatably accommodated inside a yoke (housing) forming the motor portion, and a worm and a worm wheel, which form a deceleration mechanism, are rotatably accommodated inside a gear case (housing) forming the gear portion.

In addition, a connector holding portion is formed on the yoke side of the gear case, and a connector unit (connector member) to which a drive current is supplied from an external connector is arranged inside the connector holding portion. The connector unit is provided with a connector connection portion to which the external connector is connected, and the connector connection portion is exposed to outside of the connector holding portion. Furthermore, a direction of an opening side of the connector connection portion, that is, a direction of a side to which the external connector is connected is directed to a proximal end side in an axial direction of an output shaft.

Meanwhile, the above-described motor apparatus needs to be arranged inside a door such that the motor portion is directed to a front side of a vehicle (arrangement need A), or needs to be arranged inside the door such that the gear portion is directed to the front side of the vehicle (arrangement need B), depending on a vehicle body manufacturer or the like. In this manner, in a case where the motor apparatus is arranged inside the door, the external connector is drawn out from the front side (a periphery of a hinge portion of the door or the like) of the vehicle, and thus, it is desirable that an opening side of the connector connection portion of the motor apparatus be directed to the front side of the vehicle regardless of the arrangement needs A and B as described above.

Thus, in the above motor apparatus described in Japanese Patent Application Laid-Open Publication No. 2011-254676 (FIGS. 1 and 2), there is a need to prepare a plurality of the connector members in which directions of the opening side of the connector connection portions are different from one another, in order to respond the arrangement needs A and B as described above. That is, there may occur a problem in that a manufacturing process of the motor apparatus becomes complicated, or a manufacturing cost of the motor apparatus increases.

An object of the present invention is to provide a motor apparatus improved to cope with various arrangement needs using one connector member.

SUMMARY OF THE INVENTION

According to one aspect of the present invention, there is provided a motor apparatus including: a housing to which a rotation shaft is provided; a power supply member which is provided inside the housing, and to which a drive current which rotates the rotation shaft is supplied; and a connector member which is connected to the power supply member, and supplies the drive current from an external connector to the power supply member, wherein an assembling hole is provided in the housing, an assembly body to be inserted along a center line of the assembling hole is provided in the connector member, each cross-sectional shape of the assembling hole and the assembly body in a direction intersecting the center line is formed into a point symmetrical shape with the center line as a center thereof, a pair of connector-member-side terminals which oppose each other with the center line as a center thereof is provided on a distal end side in an insertion direction of the assembly body, and a pair of power-supply-member-side terminals which oppose each other with center line as a center thereof, and to which the connector-member-side terminal is connected, is provided in a portion opposite to the assembling hole of the power supply member.

According to another aspect of the present invention, a sensor magnet is provided in the rotation shaft, a rotation sensor is provided in the connector member, and the rotation sensor is arranged to overlap with the sensor magnet at an outer side in a radial direction of the rotation shaft in both states of a first assembly state of the assembly body with respect to the assembling hole, and a second assembly state of being rotated by 180 degrees about the center line with respect to the first assembly state.

According to another aspect of the present invention, the power supply member is provided with a wall portion which covers a periphery of the sensor magnet, and a side of the power-supply-member-side terminal opposite to the assembling hole side is supported by the wall portion.

According to another aspect of the present invention, a pair of engaging portions which oppose each other with the center line as a center thereof is provided in any one of the housing and the connector member, a pair of engaged portions which oppose each other with the center line as a center thereof, with which the engaging portions are engaged is provided in the other one of the housing and the connector member, and each of the pair of engaging portions and each of the pair of engaged portions are respectively formed in point symmetrical shapes with the center line as a center thereof.

According to another aspect of the present invention, the engaging portion and the engaged portion are fixed to each other by a fixing screw.

According to the present invention, each cross-sectional shape of the assembling hole and the assembly body in the direction intersecting the center line is formed into the point symmetrical shape with the center line as the center thereof. Thus, it is possible to insert the connector member into the housing in the state of being rotated by 180 degrees about the center line. That is, it is possible to cope with arrangement needs which are different by 180 degrees in a connection direction of the external connector, using one connector member.

In addition, the pair of connector-member-side terminals which oppose each other with the center line as the center thereof is provided on the distal end side in the insertion direction of the assembly body, and the pair of power-supply-member-side terminals which oppose each other with center line as the center thereof, to which the connector-member-side terminal is connected is provided in the portion opposite to the assembling hole of the power supply member. Thus, it is possible to cope with the arrangement needs which are different by 180 degrees in the connection direction of the external connector, even for electrical connection between the connector member and the power supply member.

BRIEF DESCRIPTION OF THE DRAWINGS

FIG. 15 is a skeleton view of the connector member of FIG. 12 viewed from an arrow G direction showing shapes of a conductive member for sensor and a connector-side conductive member for driving.

DETAILED DESCRIPTION

Hereinafter, a first embodiment of the present invention will be described in detail with reference to the drawings.

Figure 1:
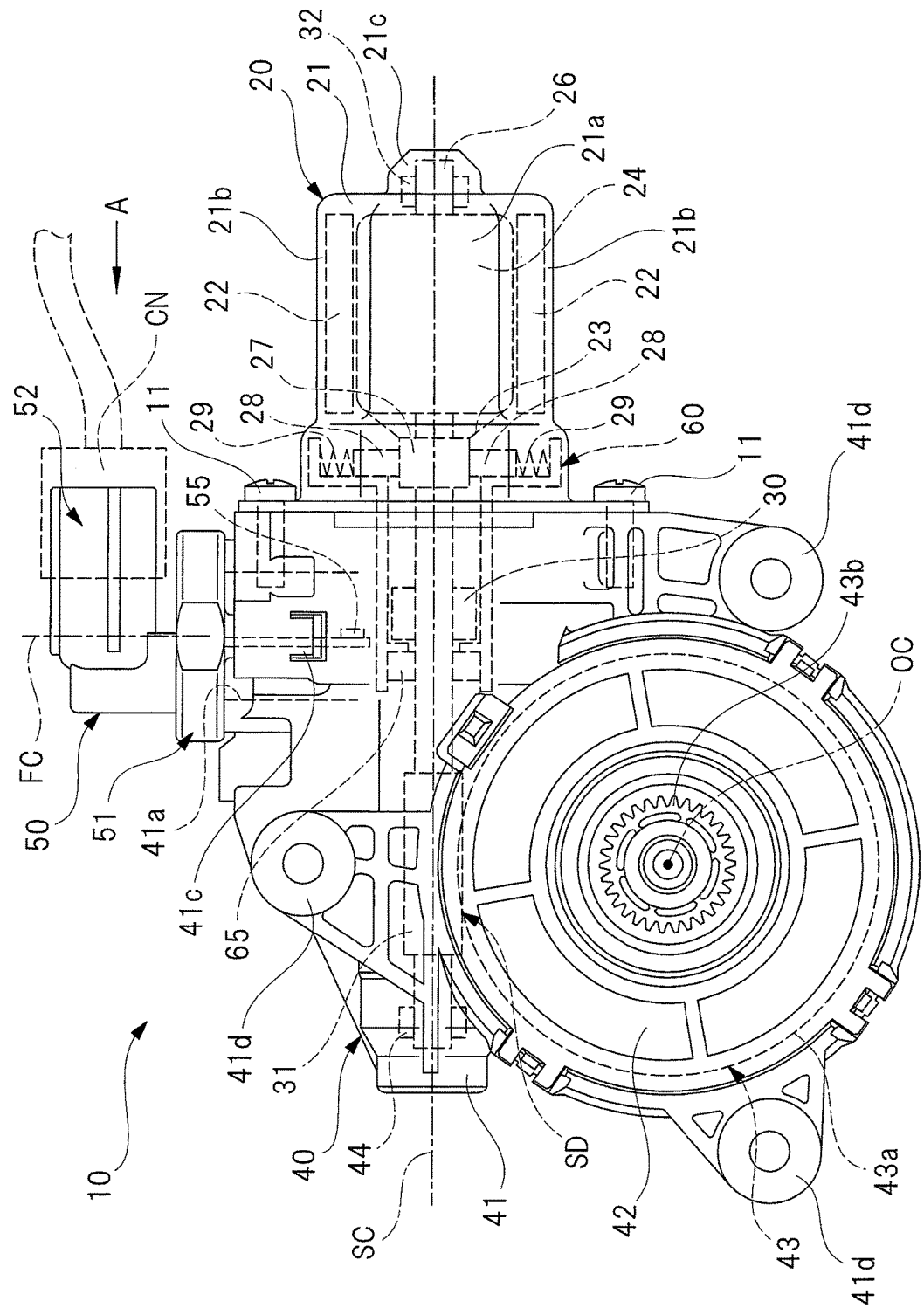
FIG. 1 is a plan view showing a motor apparatus according to a first embodiment.
Figure 2:
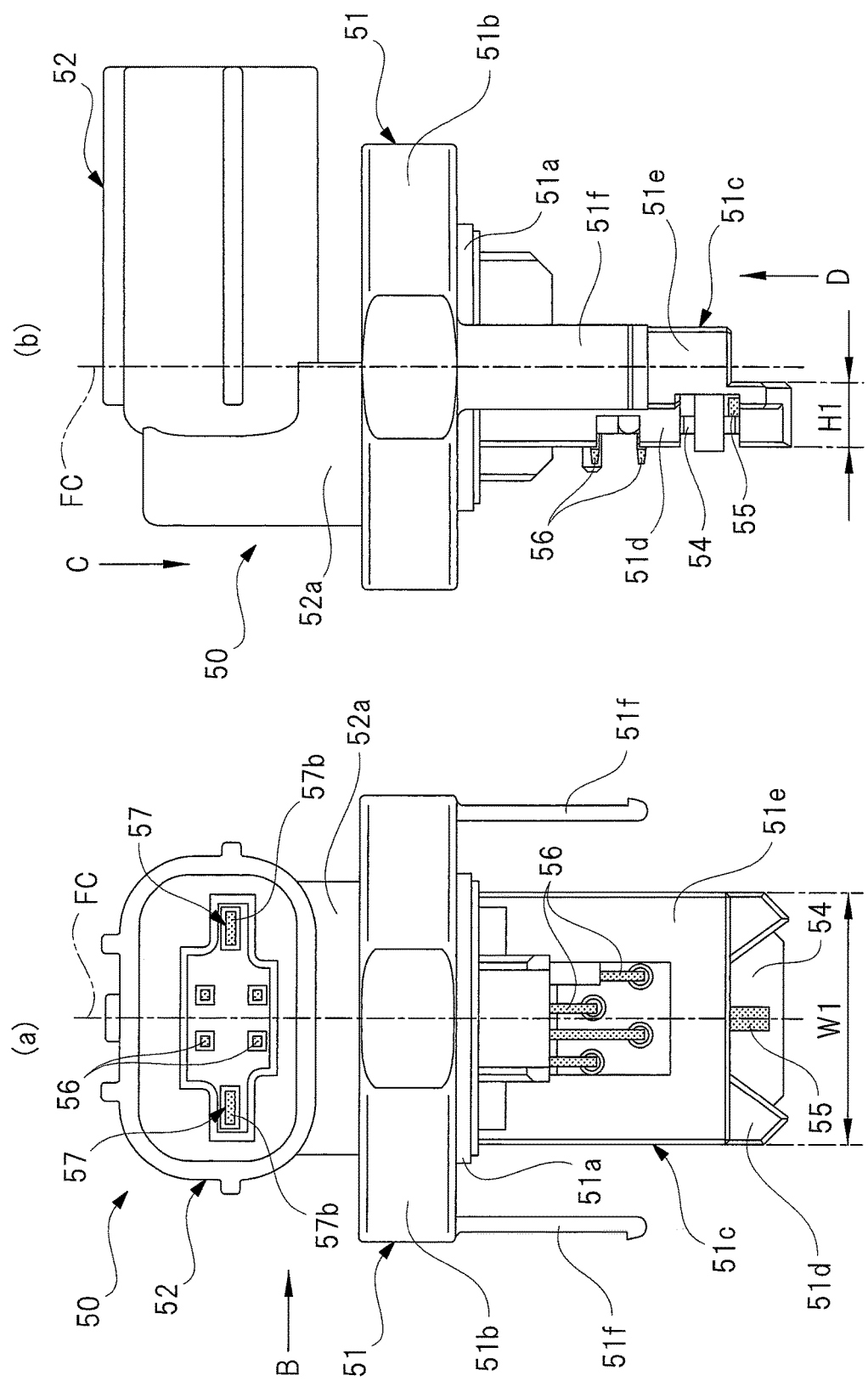
FIG. 2(a) is a diagram of a connector member viewed from a direction of an arrow "A"
FIG. 2(b) is a diagram of the connector member viewed from a direction of an arrow "B"
Figure 4:
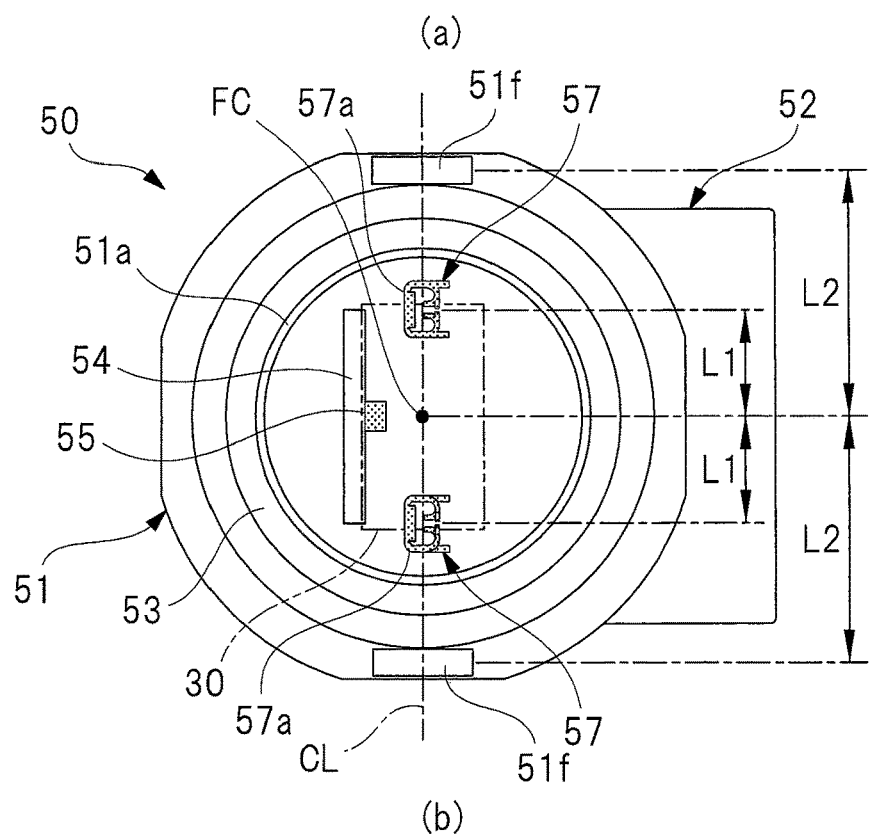
FIGS. 4(a) and 4(b) are explanatory diagrams showing the connector member in the state of being rotated by 180 degrees about a center of an insertion shaft.
Figure 4:
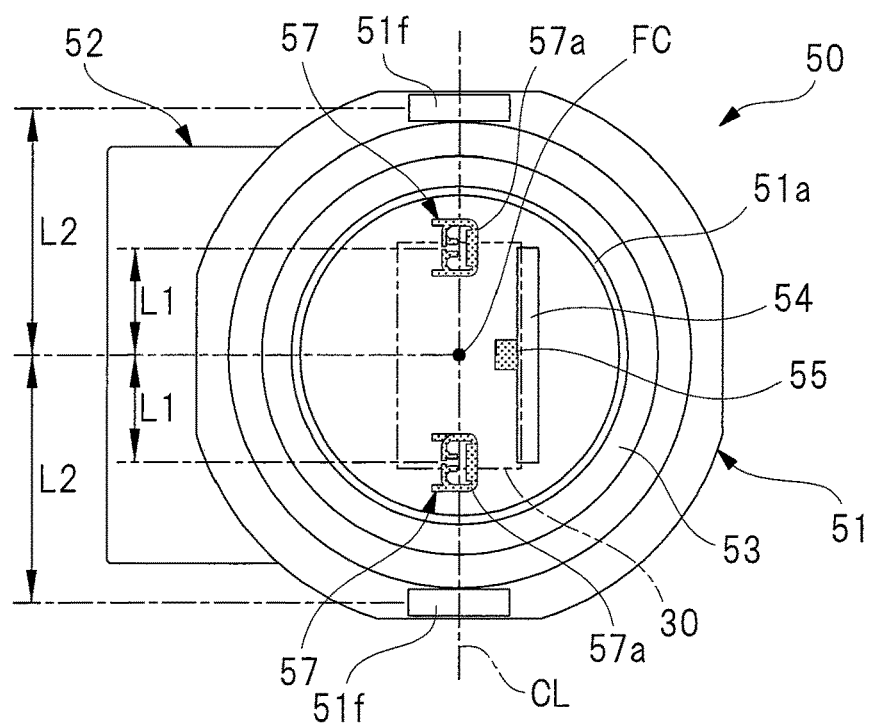
Figure 5:
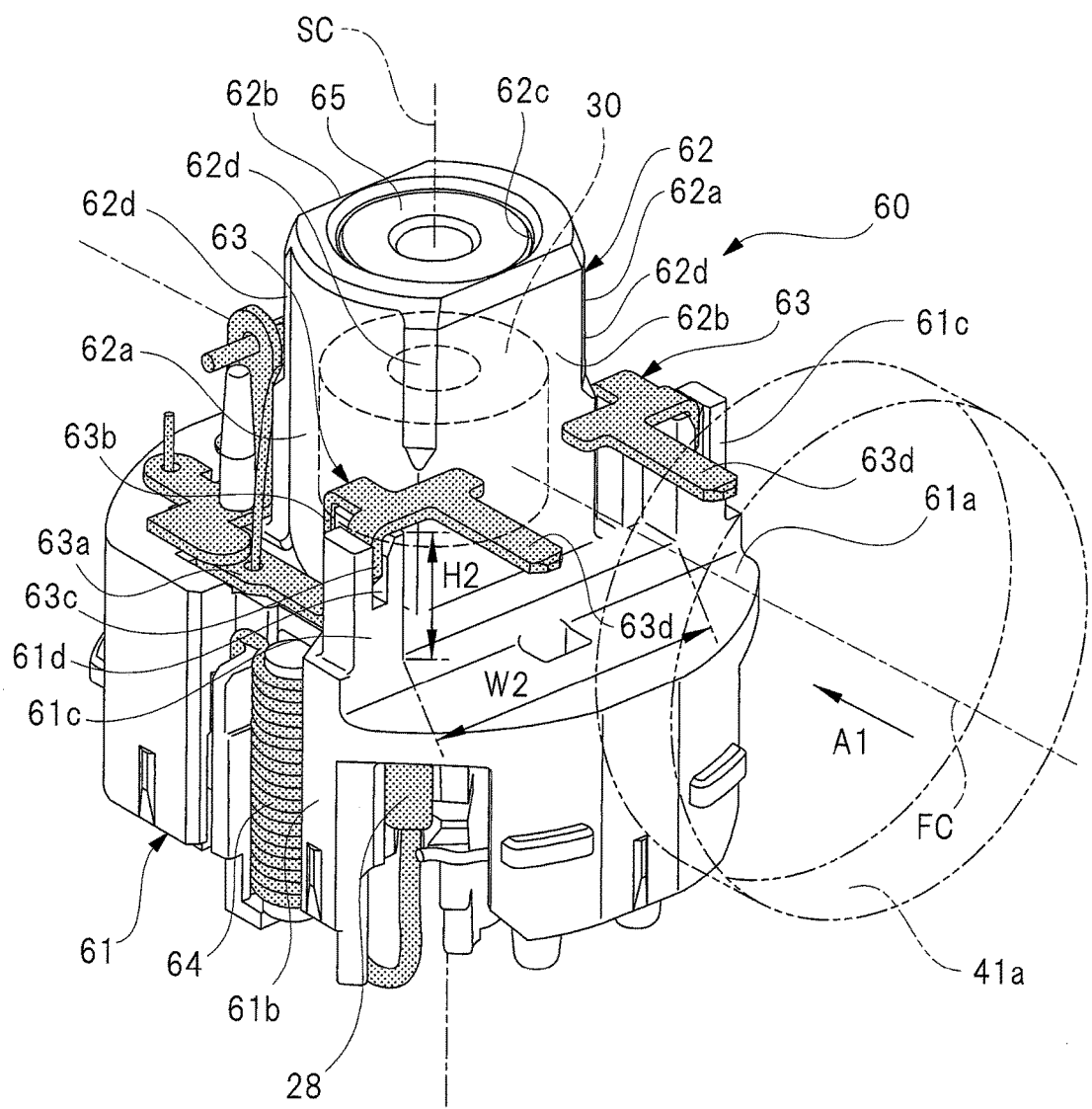
FIG. 5 is a perspective view showing a structure of a brush holder.

FIG. 1 is a plan view showing a motor apparatus according to the first embodiment; FIG. 2(a) is a diagram of a connector member viewed from an arrow A direction; FIG. 2(b) is a diagram of the connector member viewed from an arrow B direction; FIG. 3(a) is a diagram of the connector member viewed from an arrow C direction; FIG. 3(b) is a diagram of the connector member viewed from an arrow D direction; FIGS. 4(a) and 4(b) are explanatory diagrams showing the connector member in the state of being rotated by 180 degrees about a center of an insertion shaft; and FIG. 5 is a perspective view showing a structure of a brush holder.

A motor apparatus 10 shown in FIG. 1 is used as a drive source of a power window system (not shown) to be mounted to a vehicle such as an automobile, and is configured to drive a window regulator (not shown) which raises and lowers a window glass. The motor apparatus 10 is formed as a motor equipped with a deceleration mechanism capable of obtaining a large output with a small size, and is installed to a narrow space (not shown) to be formed inside a door of the vehicle. The motor apparatus 10 is provided with a motor portion 20 and a gear portion 40, and the motor portion 20 and the gear portion 40 are coupled with each other by a plurality of fastening screws 11 (two in the drawings) to form a unit.

The motor portion 20 is provided with a motor case (housing) 21 formed into a bottomed cylindrical shape by performing a press processing or the like on a steel plate made of a magnetic material. The motor case 21 is provided with plane wall portions 21a opposing each other, and arc-shaped wall portions 21b opposing each other, and a cross-sectional shape thereof is a substantially oval shape. That is, a thickness dimension in a direction in which the plane wall portions 21a of the motor case 21 oppose each other is set to be thin, and accordingly, it is possible to make the motor portion 20 in a flat shape and to arrange the motor apparatus 10 in the narrow space inside the door. Here, the gear case 41 is also formed into a flat shape following the flat shape of the motor case 21 (details thereof are not shown). Incidentally, in FIG. 1, only the plane wall portions 21a on the front side of the drawing between the plane wall portions 21a is shown.

A plurality of magnets 22 (two in the drawings), formed to have a cross portion in substantially an arc shape, is fixed to an inner side of each of the arc-shaped wall portions 21b in the motor case 21, and an armature 24 around which a coil 23 is wound is rotatably accommodated, with a predetermined gap, inside each of the magnets 22. Furthermore, a brush holder 60 is mounted to an opening side (left side in FIG. 1) of the motor case 21, and the opening side of the motor case 21 is closed by the brush holder 60.

A through hole (not shown) is formed in a shaft center SC of the armature 24, and an armature shaft 26, which is a rotation shaft, is fixed to the through hole of the armature 24 by press-fitting. The armature shaft 26 is provided to cross both the motor portion 20 and the gear portion 40 such that one side (right side in FIG. 1) in the axial direction of the armature shaft 26 is arranged inside the motor case 21, and the other side (left side in FIG. 1) in the axial direction of the armature shaft 26 is arranged inside the gear case 41.

A commutator 27, formed into substantially a cylindrical shape, is fixed to a substantially middle portion along the axial direction of the armature shaft 26, the portion adjacent to the armature 24. An end portion of the coil 23 wound around the armature 24 is electrically connected to the commutator 27.

A plurality of brushes 28 (two in the drawings), held by the brush holder 60, is provided, at an outer periphery of the commutator 27 to be slidably in contact with the commutator 27. Each of the brushes 28 is in elastic contact with the commutator 27 at a predetermined pressure by a spring member 29. Accordingly, a rotation force (electromagnetic force) is generated in the armature 24 by supplying a drive current to each brush 28 from a vehicle controller (not shown), and eventually, the armature shaft 26 is rotated by a predetermined rotational speed and rotational torque.

A sensor magnet 30 is fixed to a substantially middle portion along the axial direction of the armature shaft 26, the portion on the opposite side of the commutator 27 from the armature 24. The sensor magnet 30 is formed into an annular shape to have a plurality of polarities (for example, four poles) along a rotation direction of the armature shaft 26. The sensor magnet 30 is configured to rotate with the armature shaft 26 in an integrated manner, and accordingly, a state of magnetic flux lines with respect to a rotation sensor 55 arranged at an outer side in a radial direction of the sensor magnet 30 is changed in accordance with the rotation of the armature shaft 26.

A worm gear 31 is provided on the other side of the armature shaft 26 in the axial direction than the sensor magnet 30. The worm gear 31 is formed into substantially a cylindrical shape, and is fixed to the armature shaft 26 by press-fitting. A tooth portion 43a (details thereof are not shown) of a worm wheel 43, which is rotatably accommodated inside the gear case 41, is engaged with the worm gear 31. Accordingly, the worm gear 31 rotates in accordance with the rotation of the armature shaft 26 inside the gear case 41, and this rotation is transmitted to the worm wheel 43. Thus, the worm gear 31 and the worm wheel 43 form a deceleration mechanism SD.

A bottom portion side (right side in FIG. 1) of the motor case 21 is formed into a stepped shape, and a small-diameter portion 21c having a small diameter than a main body portion of the motor case 21 is provided in the bottom portion. A first bearing member 32 is provided in the small-diameter portion 21c, and the first bearing member 32 is configured to rotatably support one side in the axial direction of the armature shaft 26.

The gear portion 40 is provided with the gear case (housing) 41 and a connector member 50. An opening portion (not shown) on the front side of FIG. 1 of the gear case 41 is closed by a gear cover 42 formed into substantially a disc shape. The gear case 41 forming the gear portion 40 is formed into a predetermined shape using a resin material, and is coupled with the opening side of the motor case 21 via the fastening screws 11.

The worm gear 31 fixed to the armature shaft 26, and the worm wheel 43 provided with the tooth portion 43a, which is engaged with the worm gear 31 at the outer portion thereof, are rotatably accommodated inside the gear case 41. Thus, the tooth portion 43a of the worm wheel 43 is inclined at a gradual inclination angle in the axial direction of the worm wheel 43 so as to be engaged with a spiral tooth portion (not shown) formed into the worm gear 31. Accordingly, a smooth power transmission from the worm gear 31 with respect to the worm wheel 43 is possible.

An output member 43b is arranged in a shaft center OC of the worm wheel 43, and the output member 43b is connected to the window regulator (not shown) so as to allow the power transmission. That is, the rotation of the armature shaft 26 is decelerated by the deceleration mechanism SD so that the torque thereof is increased and is output from the output member 43b to the window regulator.

In addition, a second bearing member 44 is provided to a portion corresponding to the other side in the axial direction of the armature shaft 26 inside the gear case 41. The second bearing member 44 is configured to rotatably support the other side in the axial direction of the armature shaft 26.

Figure 6:
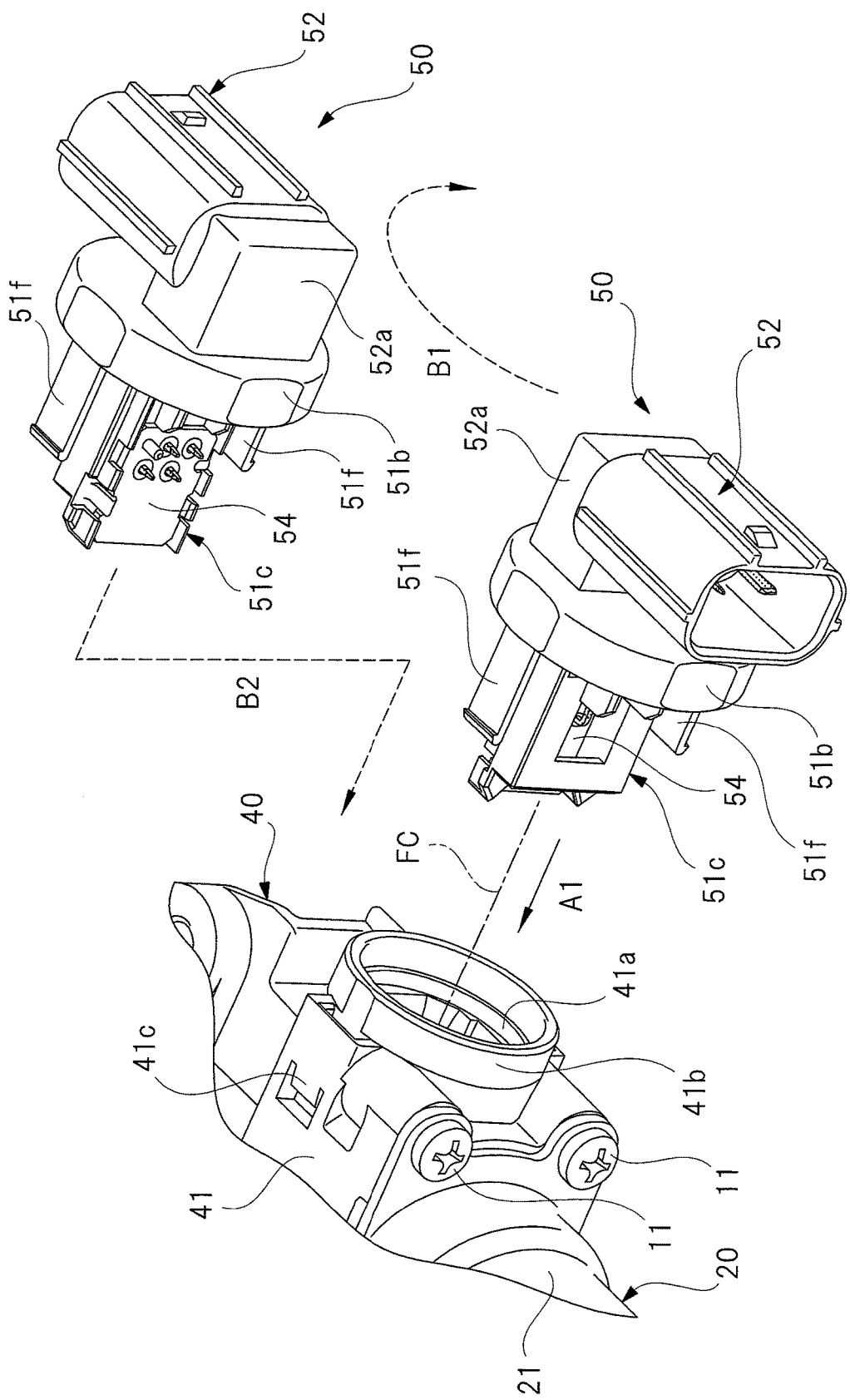
FIG. 6 is an explanatory diagram showing a mounting procedure of the connector member to a gear case.

A connector member assembling hole 41a is provided, as an assembling hole, in a side portion (upper side in FIG. 1) of the gear case 41 (see FIG. 6 for details). The connector member assembling hole 41a is formed to have a circular cross-sectional shape, and a center line FC, which is a center thereof, intersects with the shaft center SC of the armature shaft 26, and extends in a direction perpendicular with respect to the shaft center OC of the output member 43b. That is, the connector member 50 is inserted along the center line FC, which intersects with the shaft center SC and is the direction perpendicular to the shaft center OC, with respect to the connector member assembling hole 41a. Here, an extending direction of the shaft center SC represents a vertical width direction of the motor apparatus 10, an extending direction of the center line FC represents a horizontal width direction of the motor apparatus 10, and an extending direction of the shaft center OC represents a thickness direction of the motor apparatus 10. In addition, the center line FC configures a center according to the present invention.

In addition, a cylindrical mounting portion 41b (see FIG. 6) is provided in the side portion of the gear case 41, the portion on the opening side of the connector member assembling hole 41a, and a cap portion 51b (see FIGS. 2(a) and 2(b)) of the connector member 50 is mounted to the cylindrical mounting portion 41b via an O-ring 53 (see FIGS. 3(b) to 4(b)) provided in the connector member 50. Accordingly, rainwater or the like is prevented from entering the connector member assembling hole 41a.

Furthermore, a pair of engaged claws 41c is provided in the side portion of the gear case 41, the portion on a front side and a rear side corresponding to the connector member assembling hole 41a of the gear case 41. In other words, the respective engaged claws 41c are provided to oppose, respectively, one side and the other side in the axial direction of the shaft center OC, that is, in the thickness direction of the gear case 41. Incidentally, only the engaged claw 41c of one side (front side) is shown in the drawing.

Each of the engaged claws 41c is formed into a plate shape, and a plate thickness direction of the engaged claw 41c matches with the thickness direction of the gear case 41. In addition, each of the engaged claws 41c is arranged in a dead space located closer to the worm gear 31 than the fastening screw 11 for coupling the motor portion 20 and the gear portion 40 to each other, with respect to the axial direction of the shaft center SC of the armature shaft 26. Accordingly, it is configured such that the engaged claw 41c can be provided without thickening the thickness dimension of the gear case 41.

The engaged claws 41c are respectively arranged to oppose each other and symmetric with respect to the center line FC as the center thereof, and are respectively engaged with engaging claws 51f (see FIGS. 2(a) and 2(b)) of the connector member 50. Accordingly, the connector member 50 is fixed to a predetermined position of the gear case 41 in the state of being retained. Here, the engaged claws 41c of the gear case 41 form an engaged portion according to the present invention.

In addition, three fixing portions 41d are provided in the gear case 41. The fixing portions 41d are respectively arranged at a predetermined interval (interval of about 120 degrees) around the gear case 41 so as to surround the output member 43b. Furthermore, a fixing bolt (not shown) for fixing the motor apparatus 10 inside the door of the vehicle is mounted to each of the fixing portions 41d. In this manner, it is possible to support the motor apparatus 10 inside the narrow door with a favorable balance by providing the fixing portions 41d at the predetermined interval so as to surround the output member 43b, and eventually, it is possible to effectively prevent the motor apparatus 10 from rattling inside the door even when a high load is applied to the motor apparatus 10.

As shown in FIGS. 2(a) to 4(b), the connector member 50 is formed into substantially an L-shape by injection molding of a resin material such as plastic. The connector member 50 is made up of an assembly portion 51 to be amounted on the gear case 41, a connector connection portion 52 to which an external connector CN (see FIG. 1) is connected, and a coupling portion 52a which causes the assembly portion 51 and the connector connection portion 52 to be coupled with each other. The connector member 50 is connected to the brush holder 60 (see FIGS. 7 and 8 for details), and is configured to supply the drive current from the external connector CN to the brush holder 60.

The assembly portion 51 is provided with an assembly main body 51a formed to have a circular cross-sectional shape, and a cap portion 51b is provided at a periphery of the assembly main body 51a. It is configured such that the assembly main body 51a is inserted into the connector member assembling hole 41a (see FIGS. 1 and 6), and the cap portion 51b is mounted to the cylindrical mounting portion 41b (see FIG. 6). Here, the coupling portion 52a is offset by a predetermined amount from the center of the cap portion 51b, that is, the center line FC, to a side opposite to the opening side (right side of FIG. 2(b)) of the connector connection portion 52. Accordingly, it is configured such that the connector connection portion 52 does not protrude from the cap portion 51b as much as possible when the connector member 50 is viewed from a direction along the center line FC.

In a state in which the assembly main body 51a is inserted into the connector member assembling hole 41a, the O-ring 53 (see FIGS. 3(b) to 4(b)) is sandwiched between the assembly main body 51a and the connector member assembling hole 41a. That is, the O-ring 53 is configured to be elastically deformed, and further, to be in close contact with both the assembly main body 51a and the connector member assembling hole 41a. Here, the O-ring 53 functions as a seal member, and a general-purposed O-ring is used.

The center line of the assembly main body 51a matches with the center line FC, and a case portion 51c, which is formed into substantially a rectangular parallelepiped shape, is provided in an integrated manner on a side (lower side in FIGS. 2(a) and 2(b)) opposite to the connector connection portion 52 in the direction of the center line FC of the assembly main body 51a. The case portion 51c extends in the direction of the center line FC, and made up of a substrate holding portion 51d and a terminal accommodating portion 51e.

The substrate holding portion 51d is configured to hold a sensor board 54, and protrudes on the opposite side from the connector connection portion 52 compared to the terminal accommodating portion 51e. Furthermore, a width dimension along a short direction (lateral direction of FIG. 2(a)) of a protruding portion of the substrate holding portion 51d is set to W1, and a height dimension along a thickness direction (lateral direction of FIG. 2(b)) of the substrate holding portion 51d is set to H1.

The sensor board 54 held by the substrate holding portion 51d is formed into substantially a rectangular shape using, for example, a phenolic resin or the like, and the rotation sensor 55 (a shaded portion) is implemented to a central portion along a short direction (lateral direction of FIG. 2(a)) of the sensor board 54. Here, the rotation sensor 55 is arranged at an outer side in the radial direction of the sensor magnet 30 (see FIGS. 1, 4(a) and 4(b)), and configures a magnetic sensor which senses a direction of the magnetic flux line of the sensor magnet 30, or a change thereof. In this manner, the rotation sensor 55 is capable of detecting a rotation state of the armature shaft 26 (see FIG. 1), that is, a rotation direction or a rotational speed of the armature shaft 26. To be more specific, the rotation sensor 55 is provided with a magnetoresistive element (MR element) as a sensor element, and further is provided as a GMR sensor employing a giant magneto resistance effect phenomenon.

Each one side in a longitudinal direction of four sensor conductive members 56 (shaded portion) is electrically connected to the sensor board 54 by a connection means such as soldering. On the other hand, the other side in the longitudinal direction of each of the sensor conductive members 56 is exposed to an inner side of the connector connection portion 52. Accordingly, a detection signal of the rotation sensor 55 is transmitted, via each of the sensor conductive members 56 and the external connector CN (see FIG. 1), to the vehicle controller.

A pair of connector-side conductive members 57 for driving (shaded portion) is provided, in addition to the sensor conductive member 56, inside the connector member 50. Furthermore, as shown in FIG. 3(b), a connector-side female terminal 57a forming one end side in a longitudinal direction of each of the connector-side conductive members 57 for driving is accommodated inside the terminal accommodating portion 51e. That is, each of the connector-side female terminals 57a is provided on a distal end side in an insertion direction of the assembly main body 51a.

The connector-side female terminals 57a are respectively arranged inside the terminal accommodating portion 51e so as to oppose each other and symmetric with respect to the center line FC as a center thereof. That is, as shown in FIGS. 4(a) and 4(b), the connector-side female terminals 57a are respectively arranged on a center line CL passing through the center line FC, and any separation distance between each of the connector-side female terminals 57a and the center line FC is set to L1. Here, the connector-side female terminals 57a configure a connector-member-side terminal according to the present invention.

Meanwhile, a connector-side male terminal 57b is formed on the other end side in the longitudinal direction of each of the connector-side conductive members 57 for driving, and each of the connector-side male terminals 57b is exposed to the inner side of the connector connection portion 52. Accordingly, the drive current from the vehicle controller is supplied to the connector-side conductive member 57 for driving via the external connector CN (see FIG. 1).

The pair of engaging claws 51f is provided in an integrated manner on the same side of the cap portion 51b as the case portion 51c (lower side in FIGS. 2(a) and 2(b)). Each of the engaging claws 51f is engaged with each of the engaged claws 41c of the gear case 41 so as not to be disengaged in a state in which the connector member 50 is mounted to the gear case 41. Here, similarly to the engaged claws 41c, the engaging claws 51f are respectively formed into a plate shape, and it is configured such that the thickness dimension of the gear case 41 is not thickened in a state in which the engaging claws 51f are respectively engaged with the engaged claws 41c.

Similarly to the connector-side female terminals 57a, the engaging claws 51f are respectively arranged in the cap portion 51b so as to oppose each other and symmetric with respect to the center line FC as a center thereof. In addition, as shown in FIGS. 4(a) and 4(b), the engaging claws 51f are respectively arranged on the center line CL passing through the center line FC, and any separation distance between each of the engaging claws 51f and the center line FC is set to L2 (L2>L1). Here, the engaging claws 51f configure an engaging portion according to the present invention.

In this manner, each cross-section of the connector member assembling hole 41a and the assembly main body 51a in a direction intersecting the insertion direction has a point-symmetrical circular shape with the center line FC as the center. In addition, the point symmetrical shape is formed by oppositely arranging the connector-side female terminals 57a with the center line FC as the center, and oppositely arranging the engaged claws 41c and engaging claws 51f with the center line FC as the center.

Accordingly, the assembly main body 51a is inserted into the connector member assembling hole 41a while arranging the connector-side female terminals 57a and engaging claws 51f in the same positions in both states of a first assembly state (0-degree assembly state) of the connector member 50 with respect to the gear case 41, as shown in FIG. 4(a), and a second assembly state (180-degree assembly state), as shown in FIG. 4(b), obtained by performing 180-degree rotation about the center line FC with respect to the first assembly state.

In addition, the rotation sensor 55 provided in the connector member 50 is arranged, with respect to the sensor magnet 30 provided in the armature shaft 26, to overlap with the sensor magnet 30 on an outer side in the radial direction of the sensor magnet 30 in both the states of the first assembly state of FIG. 4(a), and the second assembly state of FIG. 4(b). Accordingly, an error hardly occurs when the rotation sensor 55 detects the magnetic flux lines from the sensor magnet 30, in the first assembly state and the second assembly state.

As shown in FIG. 5, the brush holder 60, as a power supply member, is provided inside the motor case 21 and the gear case 41, and is formed into a predetermined shape by injection-molding a resin material such as plastic. The brush holder 60 is provided with a holder main body 61 and a bearing holding cylinder 62. Here, in FIG. 5, electronic components to be mounted to the brush holder 60 are indicated by shading.

Figure 7:
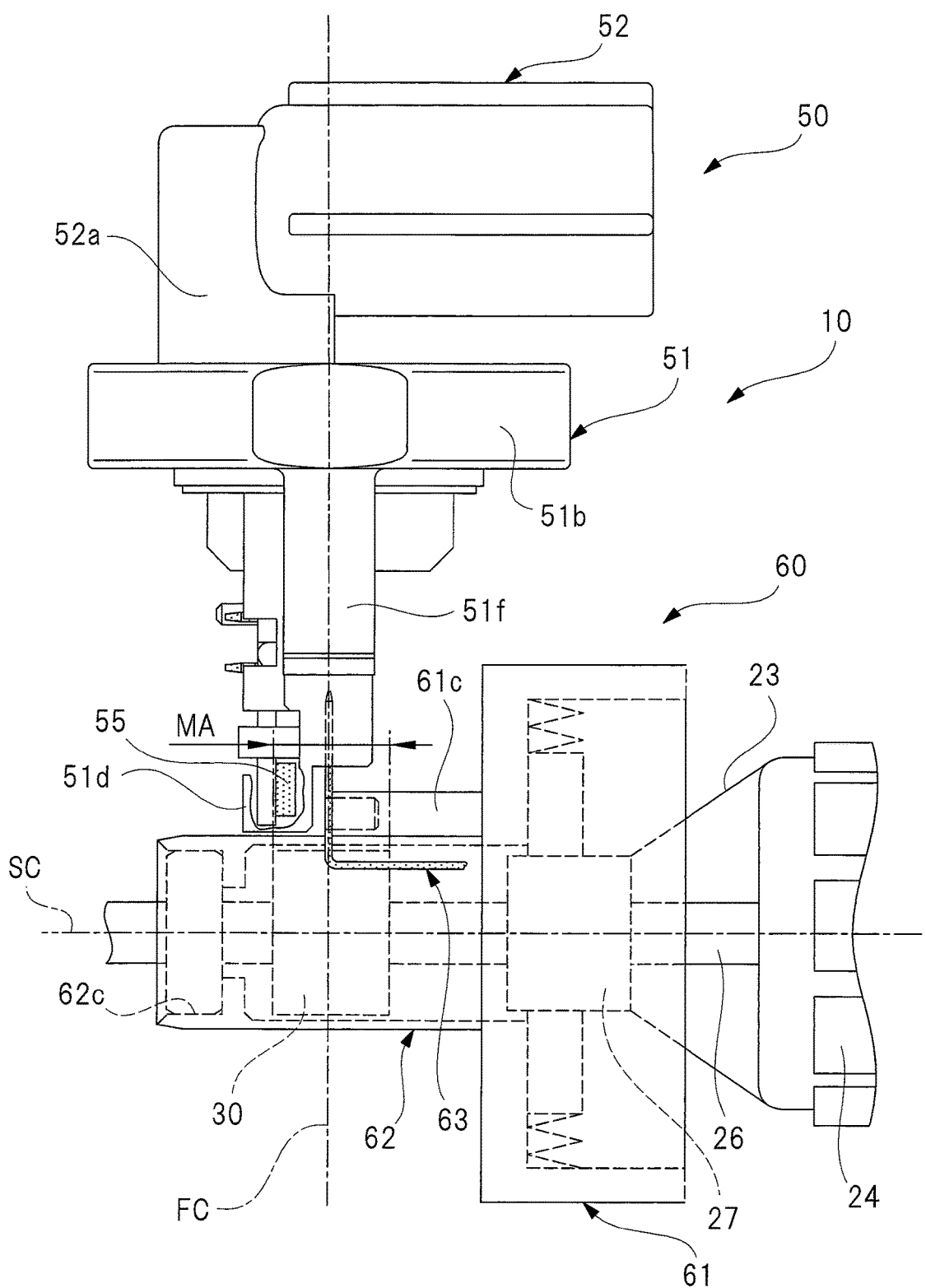
FIG. 7 is a schematic diagram showing a first assembly state (0-degree assembly state) of the connector member with respect to the brush holder.
Figure 8:
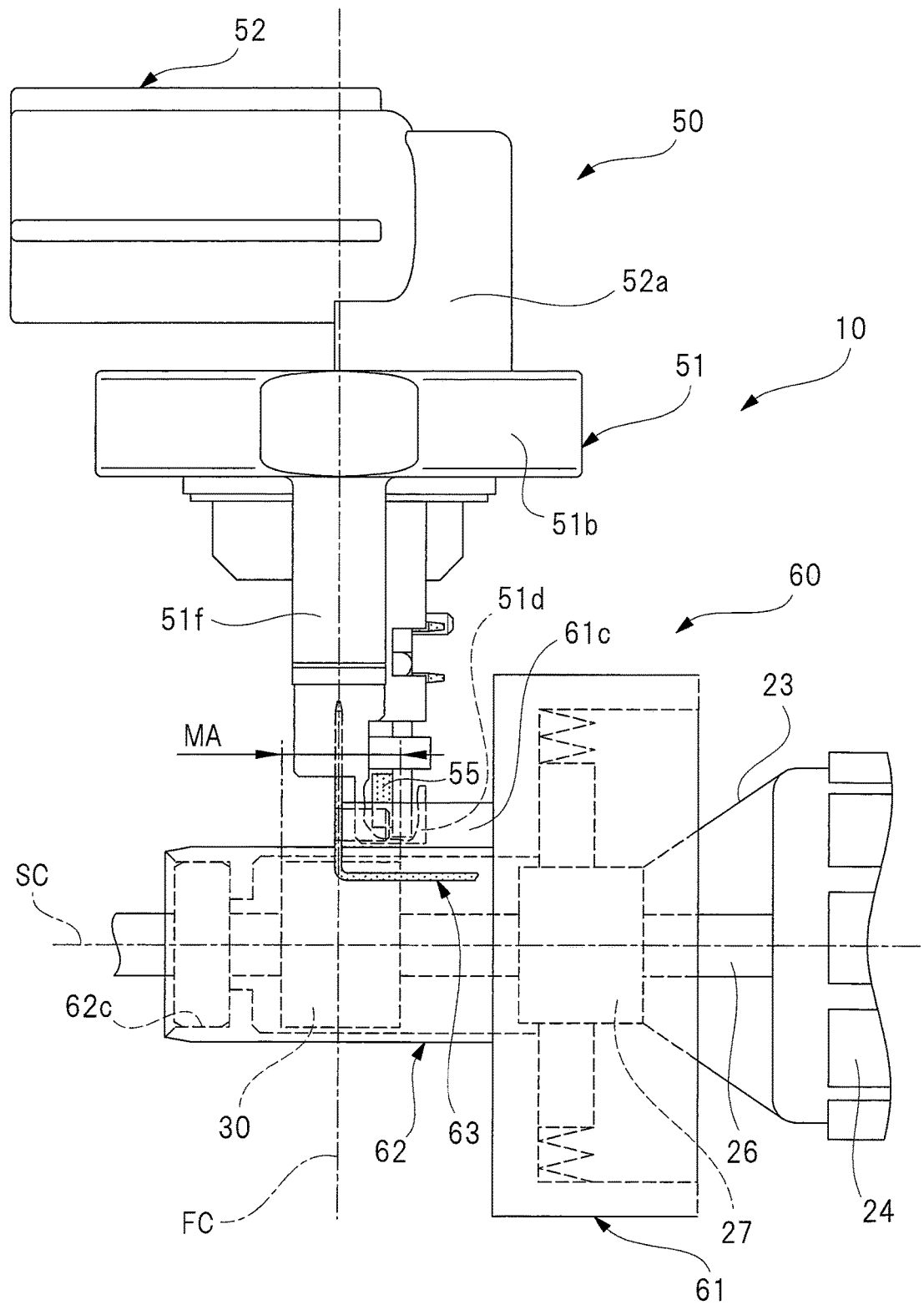
FIG. 8 is a schematic diagram showing a second assembly state (180-degree assembly state) of the connector member with respect to the brush holder.

The brush holder 60 is configured to be connected with the connector member 50 (see FIGS. 7 and 8 for details). Accordingly, the drive current rotating the armature shaft 26 is supplied from the external connector CN (see FIG. 1), via the connector member 50, to the brush holder 60.

The holder main body 61 is provided with a bottom wall portion 61a and a side wall portion 61b. In an inner side surrounded by the wall portions 61a and 61b, the plurality of brushes 28 (only one is shown in the drawings) is provided in a movable manner, and electronic components such as a condenser (not shown) are provided. In addition, a pair of brush-side conductive members 63 for driving is provided in on outer side of the bottom wall portion 61a, and a pair of choke coils 64 (only one is shown in the drawings) is provided on an outer side of the side wall portion 61b. Here, the condenser and the choke coil 64 are arranged to be electrically connected to each other between the brush 28 and the brush-side conductive member 63 for driving.

Each of the brush-side conductive members 63 for driving is formed into a predetermined shape by bending and molding a steel plate, and is provided with a main body portion 63a, an extending portion 63b, a projecting piece 63c and a brush-side male terminal 63d. The main body portion 63a is arranged along the bottom wall portion 61a, and the extending portion 63b is bent at a right angle from the main body portion 63a and extended in an extending direction of the bearing holding cylinder 62. In addition, the brush-side male terminal 63d is bent at a right angle from the extending portion 63b and extended in an extending direction of the main body portion 63a.

Accordingly, the brush-side male terminal 63d is directed to the connector member assembling hole 41a side along the direction of the center line FC, at substantially a central portion along an axial direction of the bearing holding cylinder 62. Here, it is configured such that the center line FC of the connector member assembling hole 41a is arranged in a middle portion of a line segment (not shown) connecting the brush-side male terminals 63d. That is, the brush-side male terminals 63d are respectively provided, so as to oppose each other and symmetric with respect to the center line FC as a center thereof, in a portion of the brush holder 60 opposite to the connector member assembling hole 41a.

Here, the brush-side male terminals 63d configure a power-supply-member-side terminal according to the present invention, and any separated distance between each of the brush-side male terminals 63d and the center line FC is set to a length equal to the separation distance L1 (see FIGS. 4(a) and 4(b)) between each of the connector-side female terminals 57a and the center line FC. Accordingly, the connector-side female terminal 57a is connected from an arrow A1 direction in the drawings, which is along the center line FC, to the brush-side male terminal 63d.

The projecting piece 63c is provided between the extending portion 63b and the brush-side male terminal 63d, and a distal end side thereof is bent to be directed to the bottom wall portion 61a side. Meanwhile, a pair of support projections 61c is provided in an integrated manner, to extend in the extending direction of the bearing holding cylinder 62, in a portion of the bottom wall portion 61a opposite to the respective projecting pieces 63c. A cutout portion 61d is formed in each of the support projections 61c, and each of the projecting pieces 63c is put into the cutout portion 61d. Accordingly, it is configured such that the distal end side of the brush-side male terminal 63d, arranged in a hollow portion without being supported, is prevented from rattling, and the connection between the brush-side male terminal 63d and the connector-side female terminal 57a is reliably performed in a stable manner.

Here, a separation dimension of each of the support projections 61c is set to a separation dimension W2 which is greater than the width dimension W1 (see FIG. 2(a)) along the short direction of the protruding portion of the substrate holding portion 51d (W2>W1). In addition, a height dimension of each of the support projections 61c is set to a height dimension H2 which is greater than the height dimension H1 (see FIG. 2(b)) along the thickness direction of the substrate holding portion 51d (H2>H1). Accordingly, it is configured such that the protruding portion of the substrate holding portion 51d is put between the support projections 61c without being in contact with each of the support projections 61c. Accordingly, it is possible to easily perform an assembly work of the connector member 50 with respect to the brush holder 60.

The bearing holding cylinder 62 is provided with a pair of arc-shaped walls 62a and a pair of plane walls 62b, and the pair of arc-shaped walls 62a, and the pair of plane walls 62b are arranged, respectively, so as to oppose each other. In addition, each of the pair of plane walls 62b is arranged to be perpendicular with respect to the extending direction of the brush-side male terminal 63d. In this manner, a thickness of a portion of the plane wall 62b is set to be thinner as compared to a portion of the arc-shaped wall 62a by providing the plane wall 62b, perpendicular to the extending direction of the brush-side male terminal 63d, in the bearing holding cylinder 62. Accordingly, it is possible to arrange the rotation sensor 55 adjacently to the sensor magnet 30 in a state in which the connector member 50 is mounted on the brush holder 60, and eventually, it is possible to suppress deterioration in detection accuracy of the rotation sensor 55.

In addition, a bearing accommodating portion 62c is formed in a distal end portion of the bearing holding cylinder 62 on the opposite side to the bottom wall portion 61a. Furthermore, a third bearing member 65, which rotatably supports the middle portion in the axial direction of the armature shaft 26 (see FIG. 1), is fitted and fixed to the bearing accommodating portion 62c. Here, the bearing holding cylinder 62 configures a wall portion according to the present invention.

Furthermore, in a portion adjacent to the bearing accommodating portion 62c along the axial direction of the bearing holding cylinder 62, the portion between the arc-shaped wall 62a and the plane wall 62b, reinforcement ribs 62d, which are four in total (only three are shown in the drawings) and reinforce the corresponding portion. These reinforcement ribs 62d are fixed to mounting holes (not shown) of the gear case 41 by press-fitting. In this manner, since the reinforcement rib 62d is press-fitted into the mounting hole of the gear case 41, it is possible to reliably prevent rattling of the bearing holding cylinder 62 having the thin plane wall 62b inside the gear case 41, that is, rattling of the third bearing member 65. Accordingly, it is possible to improve the quietness at the time of operation of the motor apparatus 10.

In addition, the sensor magnet 30 is arranged inside the bearing holding cylinder 62, and the plane wall 62b on the same side as the connector member assembling hole 41a supports a proximal end side of each of the brush-side male terminals 63d. That is, the bearing holding cylinder 62 of the brush holder 60 is configured to cover a periphery of the sensor magnet 30, and further to support the opposite side of the brush-side male terminals 63d from the connector member assembling hole 41a. Accordingly, deformation of the brush-side male terminal 63d is prevented while preventing the contact between the brush-side male terminal 63d and the sensor magnet 30 so as to allow an easy connection work at the time of connecting the brush-side male terminal 63d with the connector-side female terminal 57a.

Furthermore, the bearing holding cylinder 62 also serves a function as a partition wall which is arranged between the sensor magnet 30 and the rotation sensor 55 (see FIGS. 2(a) and 2(b)). Accordingly, wear particles of the brushes 28 on the same side as the sensor magnet 30 are prevented from adhering to the rotation sensor 55 and the sensor board 54 to which the rotation sensor 55 is implemented. Accordingly, it is possible to prevent deterioration in detection performance of the rotation sensor 55 for a long period of time.

Next, an assembly procedure of the motor apparatus 10 mentioned above will be described with reference to the drawings.

FIG. 6 is an explanatory diagram showing a mounting procedure of the connector member to the gear case, FIG. 7 is a schematic diagram showing the first assembly state (0-degree assembly state) of the connector member with respect to the brush holder, and FIG. 8 is a schematic diagram showing the second assembly state (180-degree assembly state) of the connector member with respect to the brush holder.

First, as shown in FIG. 1, in the motor case 21, the armature 24 and the motor portion 20 mounted on the brush holder 60 or the like are prepared, and further, the gear case 41 is prepared. Furthermore, the worm gear 31 forming the motor portion 20 and the bearing holding cylinder 62 of the brush holder 60 are inserted into the gear case 41. Thereafter, the motor case 21 is caused to abut against the gear case 41. Next, the motor case 21 and the gear case 41 are connected to be integrated by screw-coupling of fastening screw 11 using a fastening tool (not shown). Thereafter, the worm wheel 43 is accommodated inside the gear case 41 from the opening portion of the gear case 41, and the opening portion of the gear case 41 is closed by the gear cover 42.

Next, as shown in FIG. 6, the connector member 50, which has been assembled in a separate assembly step in advance, is prepared. Furthermore, as indicated by the arrow A1 in FIG. 6, the assembly main body 51a (the case portion 51c) of the connector member 50, that is, the same side as the sensor board 54 is caused to face the connector member assembling hole 41a. At this time, the opening side of the connector connection portion 52 is directed to the motor case 21 (see FIG. 1).

Furthermore, the case portion 51c and the assembly main body 51a are gradually put into the connector member assembling hole 41a in a state in which the center lines FC thereof match with each other. Accordingly, each of the connector-side female terminals 57a (see FIGS. 3(a) and 3(b)) of the connector member 50 is electrically connected to each of the brush-side male terminals 63d (see FIG. 5) of the brush holder 60. Furthermore, the cap portion 51b is mounted to the cylindrical mounting portion 41b, and an engagement state of each of the engaging claws 51f with each of the engaged claws 41c without disengaged even being pulled is formed by processing an insertion work.

Accordingly, as shown in FIG. 7, a state in which the connector member 50 is connected with the brush holder 60 is formed, and the motor apparatus 10 is completed corresponding to one arrangement need (the motor apparatus 10 in the state of FIG. 1), that is, the first assembly state (0-degree assembly state). At this time, the protruding portion of the substrate holding portion 51d is arranged closer the bearing accommodating portion 62c than the respective support projections 61c of the bearing holding cylinder 62, and the rotation sensor 55 is arranged inside a dimensional range MA in the axial direction of the sensor magnet 30.

Meanwhile, in order to cope with another arrangement need of the second assembly state (180 degrees) in which the opening side of the connector connection portion 52 is directed to the gear case 41, first, the connector member 50 is rotated by 180 degrees about the center line FC with respect to the first assembly state as indicated by a dashed arrow B1 in FIG. 6. Thereafter, as indicated by a dashed arrow B2, the case portion 51c and the assembly main body 51a are gradually inserted into the connector member assembling hole 41a similarly to the assembly procedure described above.

In this manner, as shown in FIG. 8, a state in which the connector member 50 and the brush holder 60 are connected to each other is formed, and the motor apparatus 10 improved to cope with the other arrangement need, that is, the second assembly state (180-degree assembly state) is completed. At this time, the protruding portion of the substrate holding portion 51d is arranged between the respective support projections 61c in a non-contact state with each of the support projections 61c, and the rotation sensor 55 is arranged inside the dimensional range MA in the axial direction of the sensor magnet 30.

As described above, according to the motor apparatus 10 according to the first embodiment, the cross-sectional shapes of the connector member assembling hole 41a and the assembly main body 51a in the direction intersecting the insertion direction are formed, respectively, in point-symmetrical circular shapes with the center line FC as the center, and thus, it is possible to insert the connector member 50 in the gear case 41 in the state of being rotated by 180 degrees about the center line FC. That is, it is possible to cope with the arrangement need, different by 180 degrees from the connection direction of the external connector CN, with one connector member 50.

In addition, the pair of connector-side female terminals 57a, opposed to each other with the center line FC as the center, is provided at the distal end side in the insertion direction of the assembly main body 51a, and the pair of brush-side male terminals 63d, opposed to each other with the center line FC as the center, to which the connector-side female terminals 57a are connected is provided in the portion of the brush holder 60 opposite to the connector member assembling hole 41a. Thus, it is possible to cope with the arrangement need, different by 180 degrees from the connection direction of the external connector CN also regarding the electrical connection between the connector member 50 and the brush holder 60.

Next, a second embodiment of the present invention will be described with reference to the drawings, and portions of the second embodiment having functions similar to those of the above-described first embodiment are attached with same reference signs and detailed explanation thereof is omitted.

Figure 9:
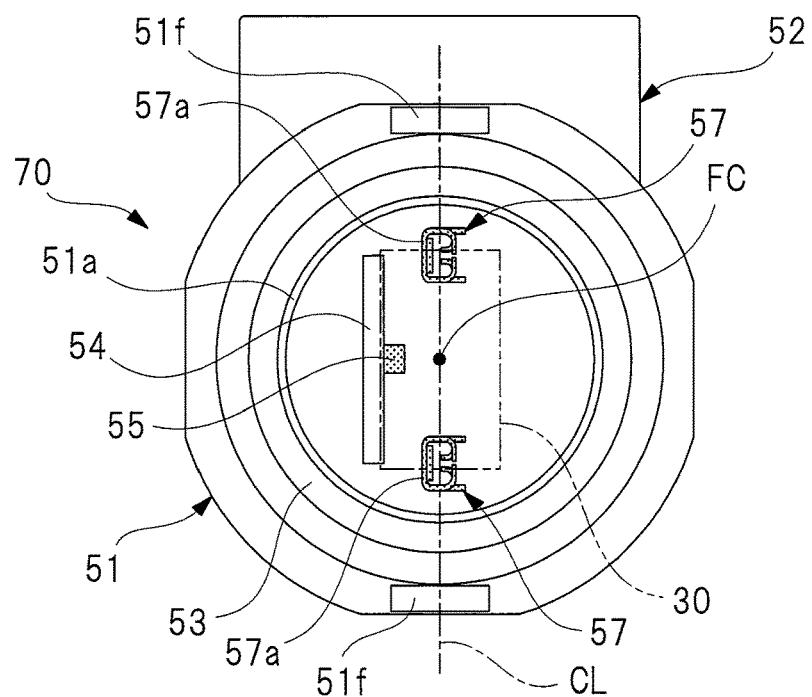
FIGS. 9(a) and 9(b) are explanatory diagrams of a connector member according to a second embodiment, which correspond to FIGS. 4(a) and 4(b)
Figure 9:
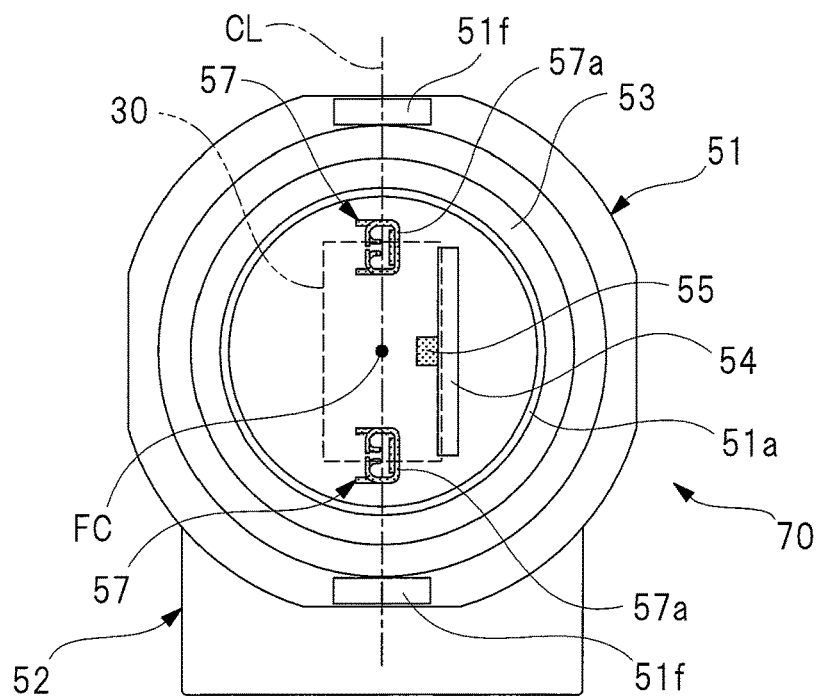

FIGS. 9(a) and 9(b) are explanatory diagrams of a connector member according to the second embodiment, which correspond to FIGS. 4(a) and 4(b).

As shown in FIGS. 9(a) and 9(b), a connector member 70 according to the second embodiment is different as compared to the connector member 50 according to the first embodiment described above, in terms of only a point in which the position of the connector connection portion 52 with respect to the assembly portion 51 is set to a position rotated by 90 degrees in a counterclockwise direction about the center line FC. That is, the direction of the opening side of the connector connection portion 52 is configured to match with a direction of the center line CL passing through the center line FC.

In the connector member 70 according to the second embodiment, it is configured such that the opening side of the connector connection portion 52 is directed to one side along the thickness direction of the gear case 41 (the first assembly state), or the other side thereof (the second assembly state) in the state of the connector member 70 being mounted on the gear case 41 (see FIGS. 1 and 6).

Even in the second embodiment formed as described above, it is possible to obtain the same operational effect as that of the first embodiment. Yet, an angle position of the connector connection portion 52 with respect to the assembly portion 51 may be any angle such as 30 degrees or 45 degrees, with the center line FC as the center.

Next, a third embodiment of the present invention will be described with reference to the drawings, and portions of the third embodiment having functions similar to those of the above-described first embodiment are attached with same reference signs and detailed explanation thereof is omitted.

Figure 10:
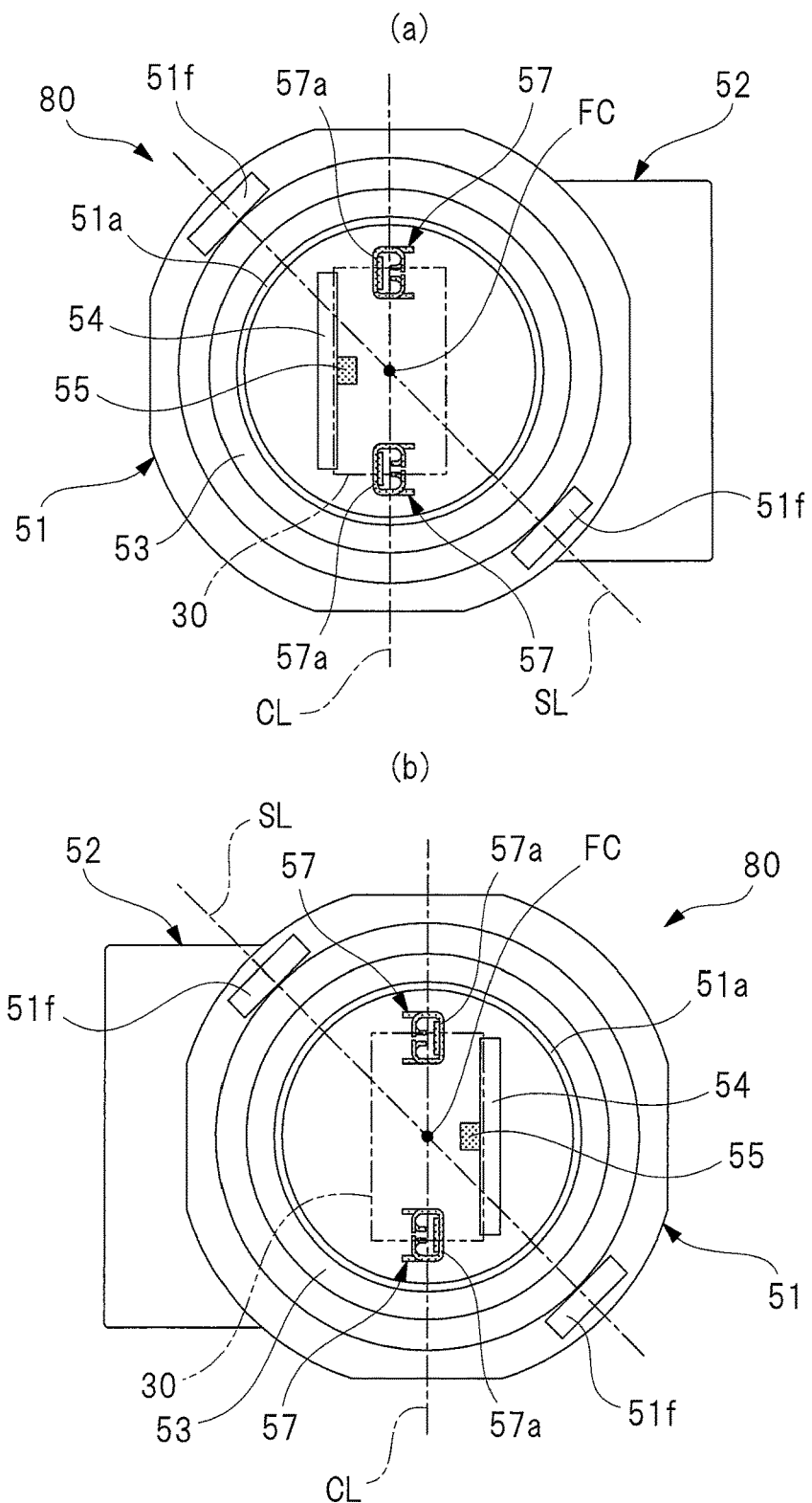
FIGS. 10(a) and 10(b) are explanatory diagrams of a connector member according to a third embodiment, which correspond to FIGS. 4(a) and 4(b)

FIGS. 10(a) and 10(b) are explanatory diagrams of a connector member according to the third embodiment, which correspond to FIGS. 4(a) and 4(b).

As shown in FIGS. 10(a) and 10(b), a connector member 80 according to the third embodiment is different as compared to the connector member 50 according to the first embodiment described above, in terms of only a point each position of the engaging claws 51f is not on the center line CL passing through the center line FC, but on a center line SL passing through the center line FC rotated by 45 degrees in the counterclockwise direction with respect to the center line CL. In this case, each position of the engaged claws 41c of the gear case 41 is also changed in accordance with a change in each position of the engaging claws 51f although details thereof are not shown.

Even in the third embodiment formed as described above, it is possible to obtain the same operational effect as that of the third embodiment. Yet, an angle position of the center line SL, which passes through the center line FC and on which the respective engaging claws 51f are arranged, may be any angle such as 30 degrees or 90 degrees, with the center line FC as the center.

Next, a fourth embodiment of the present invention will be described with reference to the drawings, and portions of the fourth embodiment having functions similar to those of the above-described first embodiment are attached with same reference signs and detailed explanation thereof is omitted.

Figure 11:
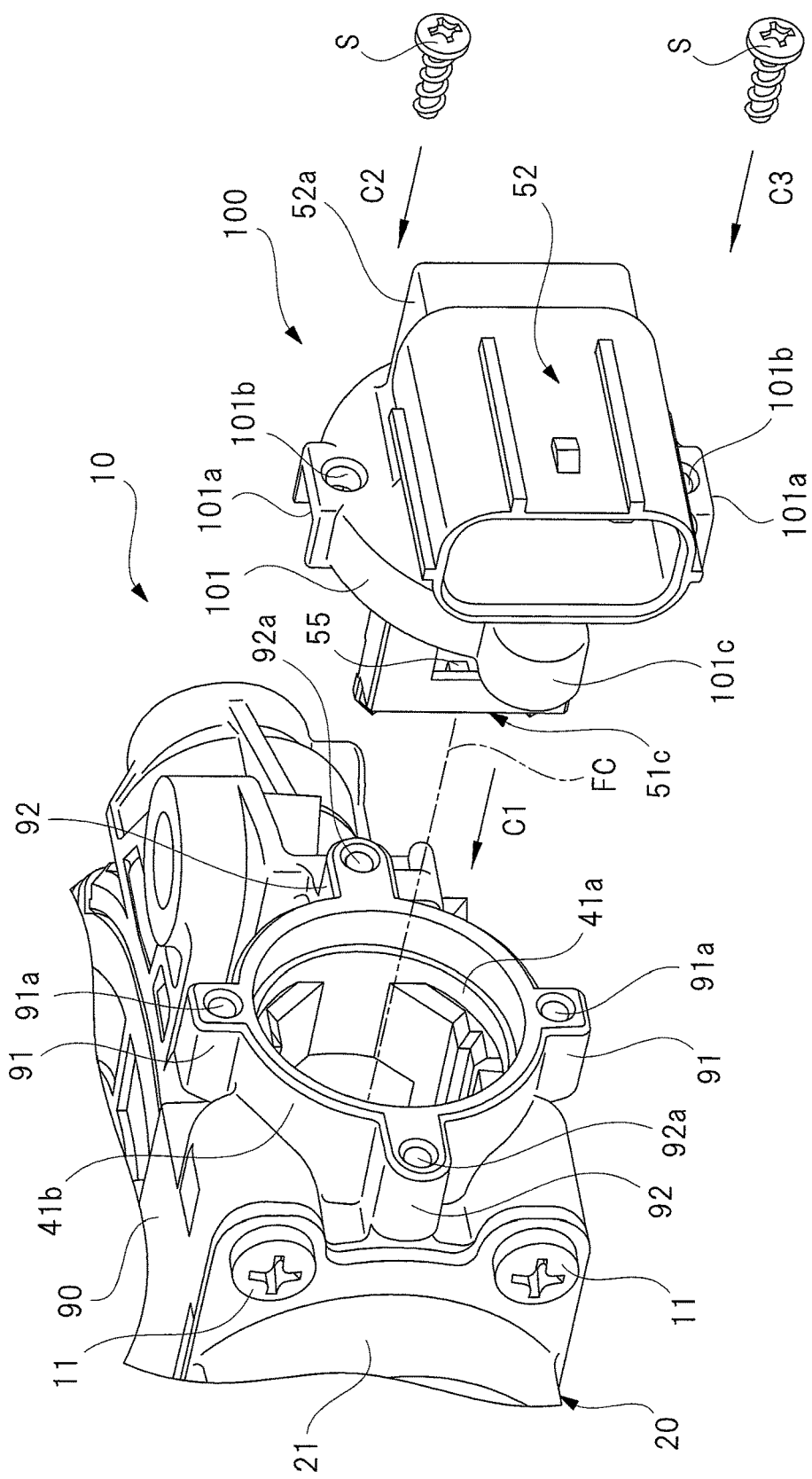
FIG. 11 is an explanatory diagram of a gear case and a connector member according to a fourth embodiment, which corresponds to FIG. 6.
Figure 12:
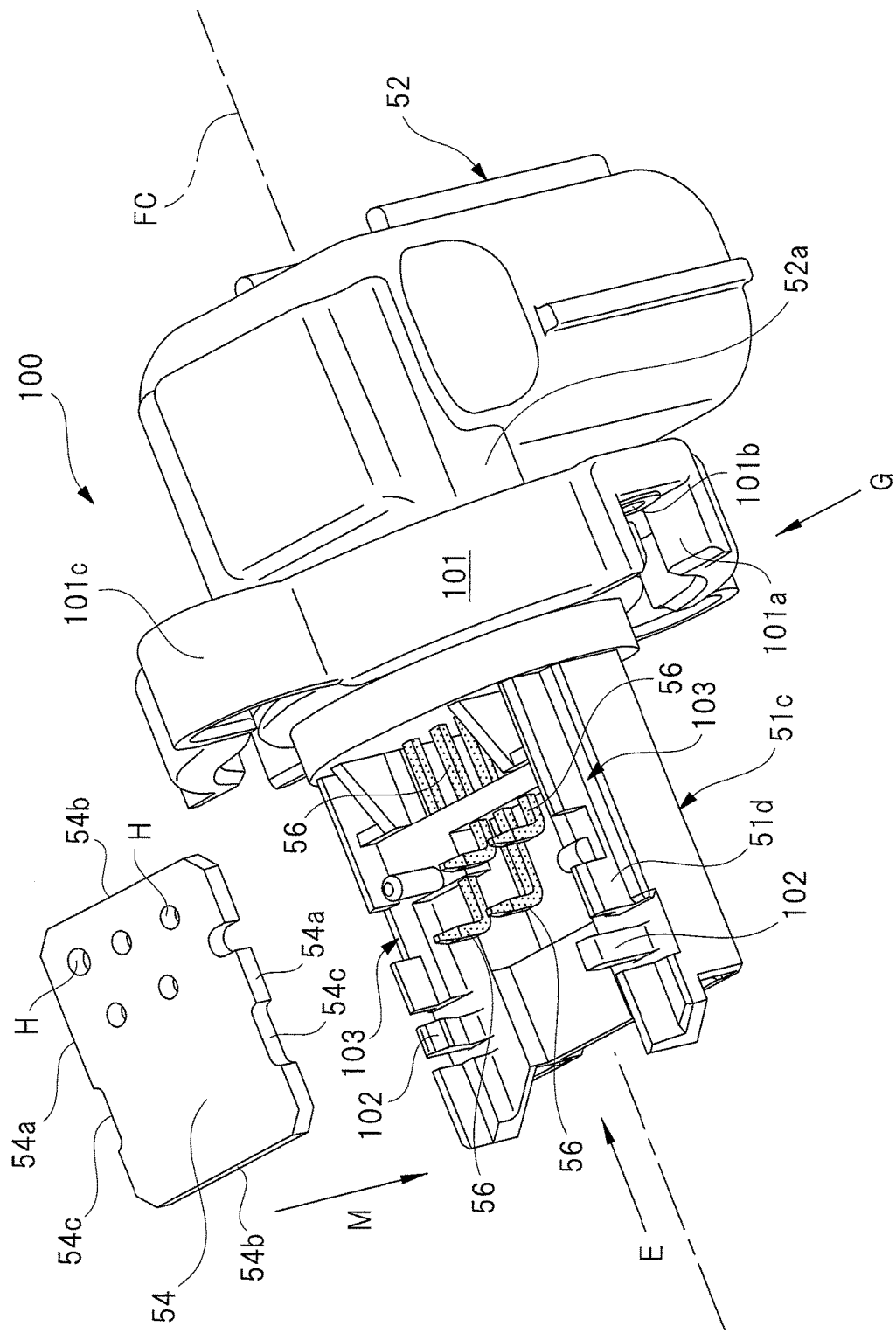
FIG. 12 is an explanatory diagram showing a detailed structure of the connector member of FIG. 11.
Figure 13:
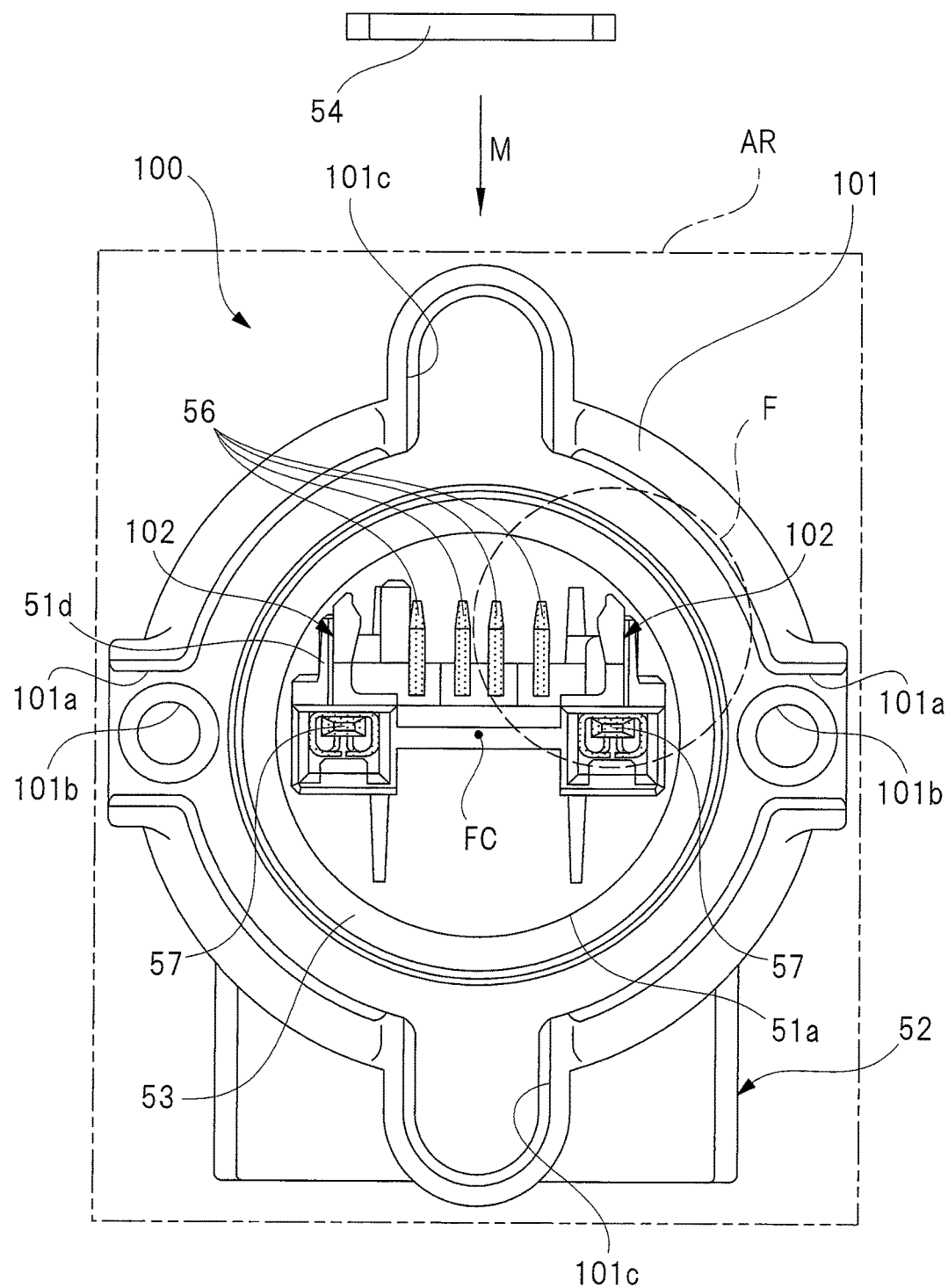
FIG. 13 is a diagram of the connector member of FIG. 12 viewed from a direction of an arrow "E"

FIG. 11 is an explanatory diagram of a gear case and a connector member according to a fourth embodiment, which corresponds to FIG. 6; FIG. 12 is an explanatory diagram showing a detailed structure of the connector member of FIG. 11; FIG. 13 is a diagram of the connector member of FIG. 12 viewed from a direction of an arrow "E"; FIGS. 14(a) and 14(b) are enlarged views of a portion surrounded by a dashed-line circle F of FIG. 13, and also explanatory diagrams showing a mounting procedure of a sensor board with respect to a substrate holding portion; and FIG. 15 is a skeleton view of the connector member of FIG. 12 viewed from an arrow G direction showing shapes of a conductive member for sensor and a connector-side conductive member for driving.

As shown in FIGS. 11 to 13, a gear case (housing) 90 and a connector member 100 according to the fourth embodiment are different as compared to the gear case 41 and the connector member 50 (see FIG. 6) according to the first embodiment described above, in terms of, firstly, a connection structure therebetween; secondly, a mounting procedure of the sensor board 54 with respect to the substrate holding portion 51d; and thirdly, a point in which the connector connection portion 52 is housed inside a range AR which surrounds the connector member 100 when the connector member 100 is viewed from a direction along the center line FC.

To be specific, with respect to the first difference, the gear case 90 and the connector member 100 are fixed to each other by a pair of fixing screws "S" in the fourth embodiment while the both are connected to each other by causing the respective engaging claws 51f of the connector member 50 to be coupled with respect to the engaged claws 41c of the gear case 41 in the first embodiment.

A pair of first engaged convex portions (engaged portions) 91 is provided so as to protrude to an outer side in a radial direction of the connector member assembling hole 41a on a front side and a rear side corresponding to the connector member assembling hole 41a of the gear case 90. In other words, each of the first engaged convex portions 91 is provided so as to oppose one side and the other side along the axial direction of the shaft center OC (see FIG. 1), that is, the thickness direction of the gear case 90. Furthermore, the female screw portions 91a extending in the direction of the center line FC are respectively provided in the first engaged convex portions 91, and the fixing screws "S" are respectively screwed to the female screw portions 91a from the direction of the center line FC.

In addition, a pair of second engaged convex portions 92 is provided in positions deviated by 90 degrees in a circumferential direction of the connector member assembling hole 41a with respect to the first engaged convex portions 91. Similarly to the each of the first engaged convex portions 91, each of the second engaged convex portion 92 is provided to protrude to the outer side in the radial direction of the connector member assembling hole 41a. Incidentally, the female screw portions 92a are respectively provided in the second engaged convex portions 92, and the second engaged convex portions 92 are provided to oppose each other along a direction of the shaft center SC (see FIG. 1) orthogonal to the shaft center OC. Here, even the respective second engaged projection 92 form the engaged portion according to the present invention, and are capable of coping with another connector member (not shown) having a different connection specification from the connector member 100.

A height dimension of each of the first engaged projections 91, is set to a dimension not exceeding the thickness dimension of the gear case 90. Furthermore, each of the first engaged convex portions 91 is arranged in a dead space located closer to the worm gear 31 (see FIG. 1) than the fastening screw 11 causing the motor portion 20 and the gear portion 40 to be coupled with each other, with respect to the axial direction of the shaft center SC. Accordingly, it is configured such that the first engaged convex portions 91 can be respectively provided without thickening the thickness dimension of the gear case 90. Incidentally, one second engaged convex portion 92 (on the same side as motor portion 20) of the second engaged convex portions 92 is also arranged in a dead space between the fastening screws 11.

A pair of first engaging concave portions (engaging portions) 101a is provided in an integrated manner in an outer peripheral portion of a cap portion 101 of the connector member 100. Each of the first engaging concave portions 101a is configured to be coupled with each of the first engaged convex portions 91 of the gear case 90 in a state in which the connector member 100 is mounted to the gear case 90. In addition, each screw insertion hole 101b to which each of the fixing screws "S" is inserted is provided in each of the first engaging concave portions 101a. Here, the connector connection portion 52 is not arranged on each axis of the screw insertion holes 101b provided respectively in the first engaging concave portions 101a. That is, each of the screw insertion holes 101b is provided in the cap portion 101 to sandwich the connector member 52 from a direction intersecting the insertion direction of the external connector CN (see FIG. 1) with respect to the connector connection portion 52. Accordingly, it is possible to easily screw each of the fixing screws "5" using a fastening tool (not shown). Furthermore, it is possible to disperse an insertion force of the external connector CN substantially equally on the fixing screws "5", and thus, it is possible to prevent the connector member 100 from an early damage.

In addition, a pair of second engaging concave portions 101c (only one is shown in the drawings), to be respectively engaged with the second engaged convex portions 92 of the gear case 90 in a state in which the connector member 100 is mounted to the gear case 90, is provided in the outer peripheral portion of the cap portion 101. Here, each of the second engaging concave portions 101c is not provided with the screw insertion holes, and the rattling of the connector member 100 in the rotation direction with the center line FC as the center with respect to the gear case 90 is prevented by causing each of the second engaging concave portions 101c and each of the second engaged convex portions 92 to be engaged with each other when the connector member 100 is mounted to the gear case 90. Here, since the screw insertion hole is not provided in each of the second engaging concave portions 101c, each of the female screw portions 92a of the second engaged convex portion 92 is closed in a state in which the connector member 100 is mounted to the gear case 90. Therefore, the second engaging concave portions 101c serve a function also as a cover which prevents dust or the like from entering the female screw portions 92a, respectively.

When the connector member 100 is mounted on the gear case 90, the case portion 51c and the assembly main body 51a (see FIGS. 3(a) and 3(b) although not shown in FIG. 11) are gradually inserted into the connector member assembling hole 41a, as indicated by an arrow C1 in the drawings, in a state in which the center lines FC thereof match with each other. Accordingly, each of the connector-side female terminals 57a (see FIGS. 3(a) and 3(b) although not shown in FIG. 11) of the connector member 100 is electrically connected to each of the brush-side male terminals 63d (see FIG. 5 although not shown in FIG. 11) of the brush holder 60. Furthermore, the cap portion 101 is mounted to the cylindrical mounting portion 41b, the first engaging concave portions 101a are respectively engaged with the first engaged convex portions 91, and the second engaging concave portions 101c are respectively engaged with the second engaged convex portions 92 to further process the insertion work.

Then, as indicated by an arrow C2 in the drawings, the fixing screws "S" are respectively inserted into the screw insertion holes 101b, and at the same time, the fixing screws "S" are respectively screwed to the female screw portions 91a with a predetermined tightening torque using a fastening tool (for example, a screwdriver or the like) (not shown). In this manner, the first engaging concave portions 101a and the first engaged convex portions 91 are respectively fixed to one another by the fixing screws "S", and the motor apparatus 10 corresponding to the arrangement need of the first assembly state (0-degree assembly state) is completed.

Meanwhile, in order to cope with the other arrangement need of the second assembly state (180 degrees), similarly to the first embodiment, the connector member 100 is rotated by 180 degrees about the center line FC with respect to the first assembly state. Thereafter, similarly to the assembly procedure described above, the case portion 51c and the assembly main body 51a are gradually inserted into the connector member assembling hole 41a, and finally, the connector member 100 and the gear case 90 are fixed to each other using the fixing screws "S".

Next, with respect to the second difference, to be specific, it is configured such that the sensor board 54 is temporarily held substantially horizontally with respect to the substrate holding portion 51*d* when the sensor board 54 is assembled with the substrate holding portion 51*d* in the fourth embodiment.

As shown in FIG. 12, a pair of long sides 54*a* and a pair of short sides 54*b* are provided in the sensor board 54, and recessed portions 54*c* are formed to oppose each other in the pair of long sides 54*a*. Each holding claw 102 of the substrate holding portion 51*d* to be described later is mounted on the recessed portion 54*c*.

The pair of holding claws 102 is provided so as to protrude in a direction opposite to an opening direction of the connector connection portion 52 with the center line FC sandwiched therebetween in the substrate holding portion 51*d*. Furthermore, a pair of slide portions 103, with the center line FC sandwiched therebetween, extending in the direction of the center line FC is provided in the substrate holding portion 51*d*. Here, the slide portion 103 is in sliding contact with a mounting hole (not illustrate) of the gear case 90 to guide the assembly of the connector member 100 to the gear case 90 when the connector member 100 is mounted on the gear case 90. Furthermore, each of the holding claws 102 is arranged in a portion adjacent to the sensor board 54 than each of the slide portions 103, and accordingly, each of the holding claws 102, in the state of holding the sensor board 54, does not protrude on the opposite side of each of the slide members 103 from the sensor board 54. Accordingly, it is possible to smoothly assemble the connector member 100 with respect to the gear case 90.

Figure 14:
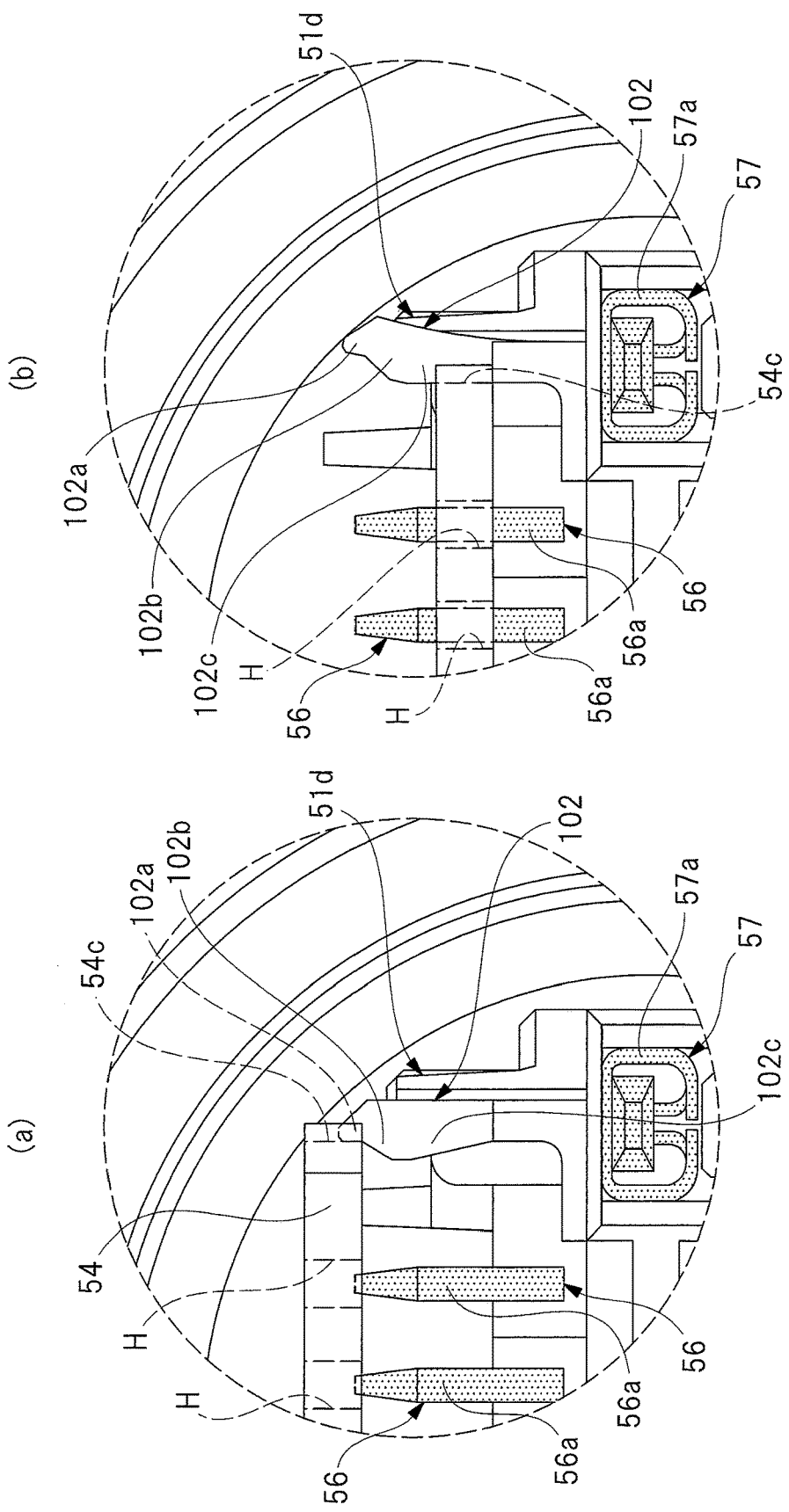
FIGS. 14(a) and 14(b) are enlarged views of a portion surrounded by a dashed-line circle F of FIG. 13, and also explanatory diagrams showing a mounting procedure of a sensor board with respect to a substrate holding portion.

As shown in FIGS. 13 to 14(*b*), each of the holding claws 102 has a temporary holding vertical wall 102*a*, a tapered convex portion 102*b* and a tapered pressing portion 102*c* from a distal end side thereof (upper side in the drawings) toward a proximal end side (lower side in the drawings). A distance between the pair of temporary holding vertical walls 102*a* is set to a distance substantially equal to a distance between the pair of recessed portions 54*c* provided in the sensor board 54. In addition, the pair of tapered convex portions 102*b* is inclinedly provided to gradually bulge to approach each other as being directed to the proximal end side of each of the holding claws 102 from each of the temporary holding vertical walls 102*a*. Furthermore, the pair of tapered pressing portions 102*c* is inclinedly provided to gradually be retracted to be separated from each other as being directed to the proximal end side of each of the holding claws 102 from each of the tapered convex portion 102*b*. Accordingly, a distance between the pair of holding claws 102 is formed such that the respective tapered convex portions 102*b* approach each other the maximum.

Next, a mounting procedure of the sensor board 54 with respect to the substrate holding portion 51*d* will be described with reference to the drawings.

First, as indicated by an arrow M in FIG. 13, the sensor board 54 is caused to face an opening side of the substrate holding portion 51*d*. At this time, the pair of recessed portions 54*c* and the pair of holding claws 102 are caused to match with each other in the direction of the center line FC. Accordingly, as shown in FIG. 14(*a*), the recessed portions 54*c* and the temporary holding vertical walls 102*a*, respectively, oppose each other, and the sensor board 54 is held by each of the holding claws 102. Accordingly, the sensor board 54 is temporarily held substantially horizontally with respect to the substrate holding portion 51*d*. Here, as shown in FIG. 14(*a*), the substrate connection portion 56*a* of the sensor conductive member 56 is positioned in a predetermined connection hole H of the sensor board 54 when a state in which the sensor board 54 is temporarily held in the substrate holding portion 51*d* is formed.

Next, the sensor board 54 is pressed toward the proximal end side of each of the holding claws 102. Then, the sensor board 54 gradually moves to proximal end side of each of the holding claws 102. Then, as shown in FIG. 14(*b*), the recessed portions 54*c* ride over the tapered convex portions 102*b*, respectively, and reach portions of the tapered pressing portions 102*c*, respectively. Accordingly, each of the holding claws 102 is elastically deformed on the side opposite to the sensor board 54 (outer side). Here, an inclined surface of each of the tapered pressing portions 102*c* is directed to the proximal end side of each of the holding claws 102, and thus, each of the holding claws 102 prevents the rattling of the sensor board 54 while pressing the sensor board 54.

Next, with respect to the third difference, to be specific, the connector connection portion 52 is housed inside the range AR which surrounds the connector member 100 as shown in FIG. 13 when the connector member 100 is viewed in the direction along the center line FC in the fourth embodiment.

In this manner, the shapes of the four sensor conductive members 56 and the two connector-side conductive members 57 for driving, which are embedded in the connector member 100, are set to shapes as shown in FIG. 15 in order to downsize the connector member 100 as much as possible. Hereinafter, a description will be made in detail regarding each shape of the sensor conductive member 56 and the connector-side conductive member 57 for driving with reference to the drawings. Incidentally, in order to make a difference therebetween obvious, the sensor conductive member 56 is indicated with hatching having a narrow interval, and the connector-side conductive member 57 for driving is indicated with hatching a wide interval.

Figure 3:
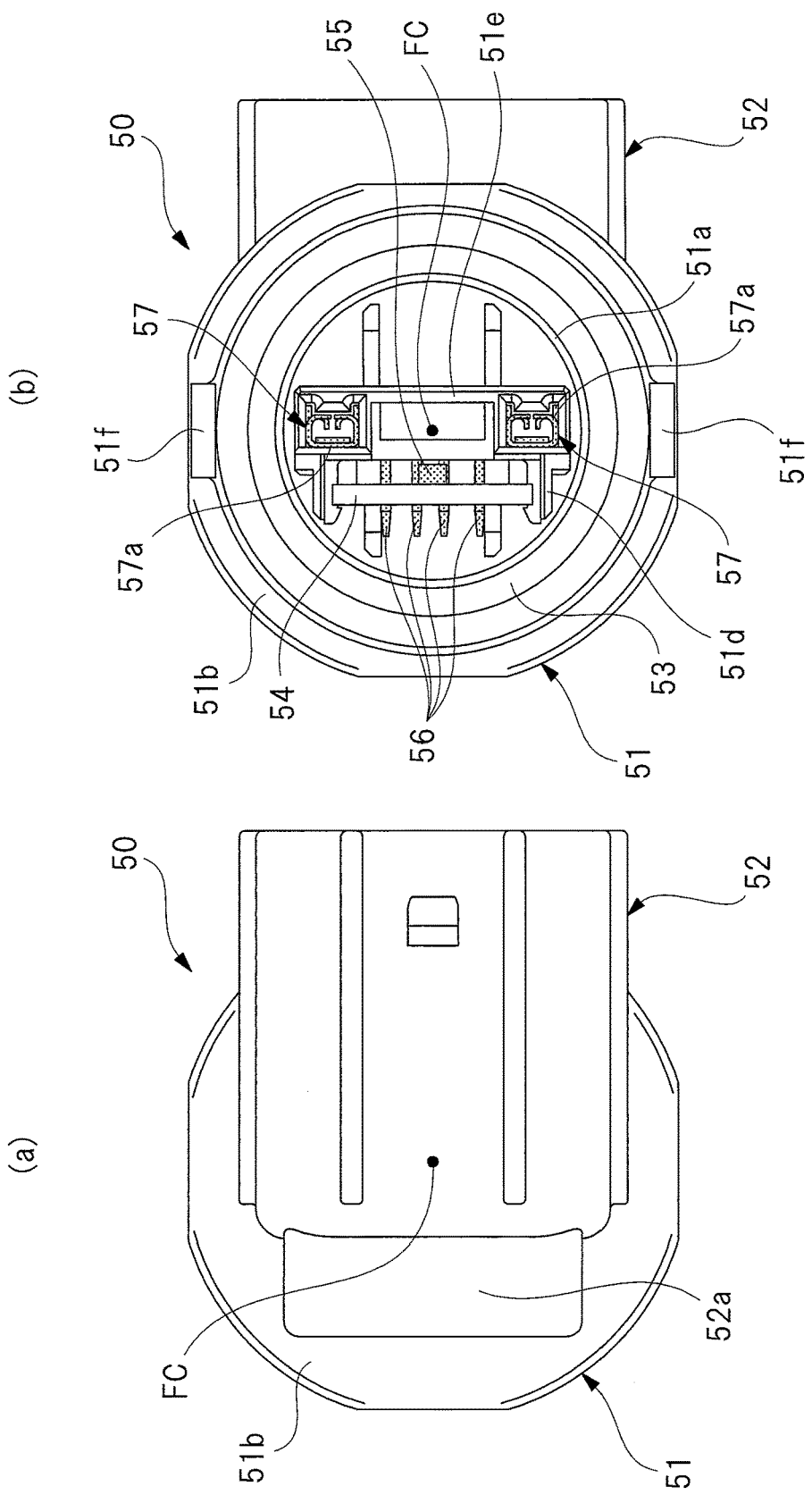
FIG. 3(a) is a diagram of the connector member viewed from a direction of an arrow "C"
FIG. 3(b) is a diagram of the connector member viewed from a direction of an arrow "D"

A female terminal fixing portion 57*c* to which the connector-side female terminal 57*a* (see FIGS. 3(*a*) and 3(*b*)) is fixed is provided on a side opposite to a side with the connector-side male terminal 57*b* of the connector-side conductive member 57 for driving. The female terminal fixing portion 57*c* extends in the direction of the center line FC, and further, is arranged at a middle portion of the cap portion 101 when the connector member 100 is viewed from side as shown in FIG. 15, in order to assemble the connector member 100 with the gear case 90 even when being rotated by 180 degrees about the center line FC. On the contrary, the coupling portion 52*a* which causes the cap portion 101 and the connector connection portion 52 to be coupled with each other is arranged on the sensor board 54 (upper side in the drawings) opposite to the opening side (lower side in the drawings) of the connector connection portion 52 with respect to the center line FC. Accordingly, it is possible to house the connector connection portion 52 inside the range AR which surrounds the connector member 100.

A first bent portion 57*d*, a second bent portion 57*e*, and a third bent portion 57*f*, each of which is bent at 90 degrees (a right angle), are provided between the female terminal fixing portion 57*c* and the connector-side male terminal 57*b* of the connector-side conductive member 57 for driving. In addition, an intermediate portion 57*g* is provided between the second and third bent portions 57*e* and 57*f*. Furthermore, as shown in FIG. 15, the second and third bent portions 57*e* and 57*f*, and the intermediate portion 57*g* are arranged on the same side as the sensor board 54 and opposite to the opening side of the connector connection portion 52 with respect to the center line FC. Accordingly, it is configured such that the coupling portion 52a can be offset from the center line FC on the same side as the sensor board 54.

In addition, the four sensor conductive members 56 are provided with the substrate connection portion 56a and a connector-side male terminal 56b. Each of the sensor conductive members 56 is formed of the sensor conductive members 56 having two types of shapes, and the one-type sensor conductive member 56 has a first bent portion 56c and a second bent portion 56d, each of which is bent at 90 degrees, between the substrate connection portion 56a and the connector-side male terminal 56b. An intermediate portion 56e is provided between the first and second bent portions 56c and 56d.

In addition, the other-type sensor conductive member 56 has a first bent portion 56f, a second bent portion 56g, a third bent portion 56h, and a fourth bent portion 56i, each of which is bent at 90 degrees, between the substrate connection portion 56a and the connector-side male terminal 56b. A first intermediate portion 56j is provided between the first and second bent portions 56f and 56g, and a second intermediate portion 56k is provided between the third and fourth bent portions 56h and 56i.

Furthermore, as shown in FIG. 15, the first and second bent portions 56c and 56d and the intermediate portion 56e, and further, the first to fourth bent portions 56f to 56i, and the first and second intermediate portions 56j and 56k are arranged on the same side as the sensor board 54 and opposite to the opening side of the connector connection portion 52 with respect to the center line FC. Accordingly, it is configured such that the coupling portion 52a can be offset from the center line FC to the sensor board 54.

Even in the fourth embodiment formed as described above, it is possible to obtain the same operational effect as that of the first embodiment described above. In addition, in the fourth embodiment, the first engaging concave portions 101a and the first engaged convex portions 91 are respectively fixed to each other by the fixing screws "S". Accordingly, as compared to the first embodiment, it is possible to fix the connector member 100 to the gear case 90 in the state of further suppressing the rattling. Accordingly, it is possible to set the position of the rotation sensor 55 with respect to the sensor magnet 30 (see FIG. 1 although not shown in FIG. 11) inside the gear case 90 with high accuracy without variation for each product.

In addition, since it is possible to temporarily hold the sensor board 54 to be substantially horizontal to the substrate holding portion 51d in the fourth embodiment, it is possible to cause the sensor board 54 to be held by the substrate holding portion 51d with favorable accuracy. Accordingly, it is possible to suppress deterioration in detection accuracy of the rotation sensor 55 (see FIG. 11). Furthermore, since it is possible to house the connector connection portion 52 inside the range AR which surrounds the connector member 100 in the fourth embodiment, it is possible to further downsize the connector member 100, of course, and it is possible to downsize a mold (not shown) to be used for the injection molding of the connector member 100.

The present invention is not limited to each embodiment described above, and it is obvious that various modifications are possible within a range not departing a gist thereof. For example, in each embodiment described above, each cross-sectional shape of the connector member assembling hole 41a and the assembly main body 51a in the direction intersecting the insertion direction is the point-symmetrical circular shape with the center line FC as the center, but the present invention is not limited thereto. The point is that, any point symmetrical shape which enables a shape after being rotated by 180 degrees about the center line FC to be the same as a shape before the rotation may be possible, and for example, the cross-sectional shape in the direction intersecting the insertion direction may be a square, a hexagon, or the like.

In addition, in each embodiment described above, one GMR sensor which reacts to the magnetic flux line formed by the sensor magnet 30 is used as the rotation sensor 55, but the present invention is not limited thereto. A plurality of cheap MR sensors may be used, or another magnetic sensor (Hall IC or the like) can be used.

Furthermore, in each embodiment described above, the motor apparatus 10 is used as the drive source of the power window system to be mounted to a vehicle, but the present invention is not limited thereto. The motor apparatus can be used as another drive source for a sun roof system or the like.

In addition, in each embodiment described above, the motor portion employing the brush-equipped electric motor is described as the motor portion 20, but the present invention is not limited thereto. It is possible to employ a brushless electric motor or the like having a rotation shaft as a gear portion. In this case, a bus bar unit (current collector) as a power supply member is employed instead of the brush holder as the power supply member.

The motor apparatus is used to drive the window regulator and raise and lower the window glass of the power window system mounted to a vehicle such as an automobile.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A motor apparatus including:
a motor portion provided with a housing in which a rotation shaft is provided;
a power supply member which is provided inside the housing; and
a connector member which is connected to the power supply member, and supplies a drive current from an external connector to the power supply member so that the drive current rotates the rotation shaft, wherein
the housing is provided with an assembling hole,
the connector member is provided with an assembly main body to be inserted along a center line of the assembling hole,
the assembling hole is symmetric with respect to a plane passing through the center line of the assembling hole,
the assembly main body has an outer periphery which is symmetric with respect to a plane passing through an center line of the assembly main body,
a pair of connector-side conductive members is provided to the connector member, and has a pair of connector-member-side terminals which is provided on a distal end side in an insertion direction of the assembly main body, and symmetrically disposed with respect to the plane passing through the center line of the assembly main body,
a pair of brush-side conductive members is provided to the power supply member, and has a pair of power-supply-member-side terminals which is symmetrically disposed with respect to the plane passing through the center line of the assembling hole, and connected to the connector-member-side terminals, when the assembly main body is inserted in the assembling hole, the center line of the assembly main body is aligned with the center line of the assembling hole,
the connector member is further provided with a cap portion having an outer periphery provided with: a pair of first engaging portions symmetrically disposed with respect to the center line of the assembly main body; and a pair of second engaging portions symmetrically disposed with respect to the center line of the assembly main body,
the housing has: a pair of first engaged portions which is symmetrically disposed with respect to the center line of the assembling hole, and respectively engaged with the first engaging portions of the connector member when the assembly main body is inserted in the assembling hole; and a pair of first engaged portions which is symmetrically disposed with respect to the center line of the assembling hole, and respectively engaged with the first engaging portions of the connector member when the assembly main body is inserted in the assembling hole,
when the connector-side conductive members are electrically connected to the brush-side conductive members, the first and second engaging portions of the connector member and the first and second engaged portions of the housing selectively set the connector member in two different directions of the rotation shaft.

2. The motor apparatus according to claim 1, wherein
a sensor magnet is placed on the rotation shaft,
a rotation sensor is provided in the connector member, and the rotation sensor is arranged to face the sensor magnet at an outer side in a radial direction of the rotation shaft with the connector member directed in a first direction, or with the connector member directed in a second direction opposite to the first direction, and
when the assembly main body is inserted in the assembling hole, the rotation sensor selectively takes two positions symmetrically defined with respect to the center line of the assembling hole by changing the direction of the connector member.

3. The motor apparatus according to claim 2, wherein
the power supply member is provided with a wall portion which extends along the rotation shaft to cover the sensor magnet, and the power-supply-member-side terminals is supported by the wall portion.

4. The motor apparatus according to claim 1, wherein
the connector member is further provided with a coupling portion which is coupled to the cap portion and a connector connection portion which is connected to the external connector,
the coupling portion is offset from the center line of the assembly main body by a predetermined amount in a direction opposite to an opening of the connector connection portion.

5. The motor apparatus according to claim 4, wherein
the engaging portion and the engaged portion are fixed to each other by a fixing screw.

6. A motor apparatus including:
a motor portion provided with a housing in which a rotation shaft is provided;
a power supply member which is provided inside the housing; and
a connector member which is connected to the power supply member, and supplies a drive current from an external member to the power supply member so that the drive current rotates the rotation shaft, wherein
the housing is provided with an assembling hole,
the connector member is provided with an assembly main body to be inserted along a center line of the assembling hole,
the assembling hole is symmetric with respect to a plane passing through the center line of the assembling hole,
the assembly main body has an outer periphery which is symmetric with respect to a plane passing through an center line of the assembly main body,
a pair of connector-side conductive members is provided to the connector member, and has a pair of connector-member-side terminals which is provided on a distal end side in an insertion direction of the assembly main body, and symmetrically disposed with respect to the plane passing through the center line of the assembly main body,
a pair of brush-side conductive members is provided to the power supply member, and has a pair of power-supply-member-side terminals which is symmetrically disposed with respect to the plane passing through the center line of the assembling hole, and connected to the connector-member-side terminals,
when the assembly main body is inserted in the assembling hole, the center line of the assembly main body is aligned with the center line of the assembling hole,
the connector member is further provided with a cap portion having an outer periphery provided with: a pair of first engaging portions symmetrically disposed with respect to the center line of the assembly main body; and a pair of second engaging portions symmetrically disposed with respect to the center line of the assembly main body,
the housing has: a pair of first engaged portions which is symmetrically disposed with respect to the center line of the assembling hole, and respectively engaged with the first engaging portions of the connector member when the assembly main body is inserted in the assembling hole; and a pair of first engaged portions which is symmetrically disposed with respect to the center line of the assembling hole, and respectively engaged with the first engaging portions of the connector member when the assembly main body is inserted in the assembling hole,
a sensor magnet is placed on the rotation shaft,
a rotation sensor is provided in the connector member, and the rotation sensor is arranged to face the sensor magnet at an outer side in a radial direction of the rotation shaft with the connector member directed in a first direction, or with the connector member directed in a second direction opposite to the first direction, and
when the assembly main body is inserted in the assembling hole, the rotation sensor selectively takes two positions symmetrically defined with respect to the center line of the assembling hole by changing the direction of the connector member.

7. The motor apparatus according to claim 6, wherein
the power supply member is provided with a wall portion which extends along the rotation shaft to cover the sensor magnet, and the power-supply-member-side terminals is supported by the wall portion.

8. The motor apparatus according to claim 6, wherein
the connector member is further provided with a coupling portion which is coupled to the cap portion and a connector connection portion which is connected to the external connector, the coupling portion is offset from the center line of the assembly main body by a predetermined amount in a direction opposite to an opening of the connector connection portion.

9. The motor apparatus according to claim 8, wherein the engaging portion and the engaged portion are fixed to each other by a fixing screw.

* * * * *